(12) United States Patent
Aoki et al.

(10) Patent No.: US 10,345,508 B2
(45) Date of Patent: *Jul. 9, 2019

(54) DISPLAY DEVICE WITH FIRST MEMBER HAVING A PLURALITY OF PARTITIONS AND A PLURALITY OF SECOND MEMBERS, EACH SECOND MEMBER DISPOSED IN BETWEEN ADJACENT PARTITIONS

(71) Applicant: Japan Display Inc., Tokyo (JP)

(72) Inventors: Shigenori Aoki, Tokyo (JP); Susumu Kimura, Tokyo (JP); Tsutomu Harada, Tokyo (JP); Naoyuki Takasaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,985

(22) Filed: Jan. 25, 2018

(65) Prior Publication Data
US 2018/0149801 A1 May 31, 2018

Related U.S. Application Data

(63) Continuation of application No. 14/837,342, filed on Aug. 27, 2015, now Pat. No. 9,897,743.

(30) Foreign Application Priority Data

Aug. 28, 2014 (JP) .................... 2014-174306

(51) Int. Cl.
*F21V 8/00* (2006.01)
*G02F 1/1335* (2006.01)

(52) U.S. Cl.
CPC .......... *G02B 6/0061* (2013.01); *G02B 6/003* (2013.01); *G02B 6/0046* (2013.01); *G02B 6/0078* (2013.01); *G02B 6/0021* (2013.01); *G02B 6/0038* (2013.01); *G02B 6/0041* (2013.01); *G02B 6/0055* (2013.01); *G02B 6/0065* (2013.01); *G02F 1/133615* (2013.01)

(58) Field of Classification Search
CPC .... G02B 6/0036; G02B 6/0038; G02B 6/005; G02B 6/0061; G02B 6/0075; G02B 6/0076; G02B 6/0078; G02B 6/004; G02B 6/0068
USPC ........................................................ 362/606
See application file for complete search history.

(56) References Cited

U.S. PATENT DOCUMENTS 8,585,268 B2 11/2013 Yankov
2009/0167990 A1 7/2009 Konno

FOREIGN PATENT DOCUMENTS

JP 2000-047038 2/2000

*Primary Examiner* — Robert J May
(74) *Attorney, Agent, or Firm* — K&L Gates LLP

(57) ABSTRACT

According to one embodiment, an illumination device includes a light source, clad, and a plurality of cores. The clad includes a first edge at a light source side, a second edge opposite to the first edge, and a plurality of grooves formed by a plurality of partitions extending in parallel to each other from the first edge to the second edge. The cores are accommodated in the grooves, and each core includes an incident surface on which light from the light source is incident and an exit surface exposed from the groove to emit the light incident on the incident surface.

19 Claims, 15 Drawing Sheets

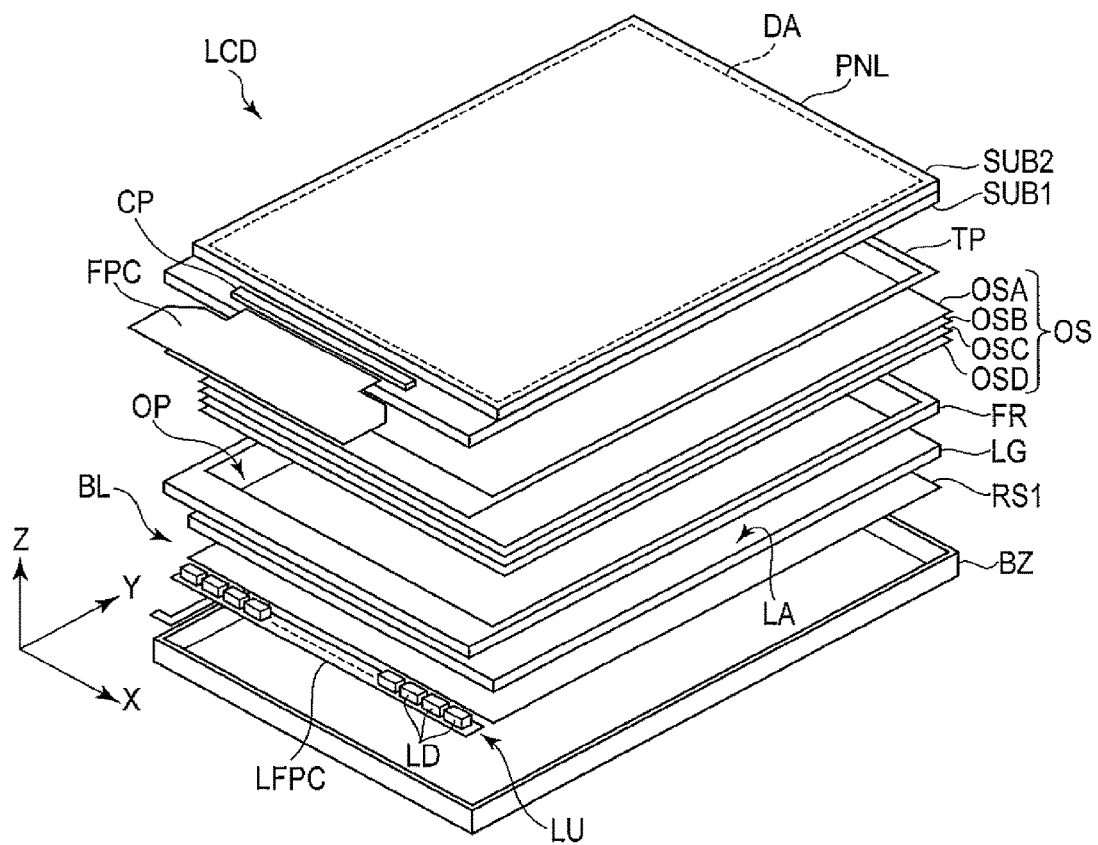
F I G. 1

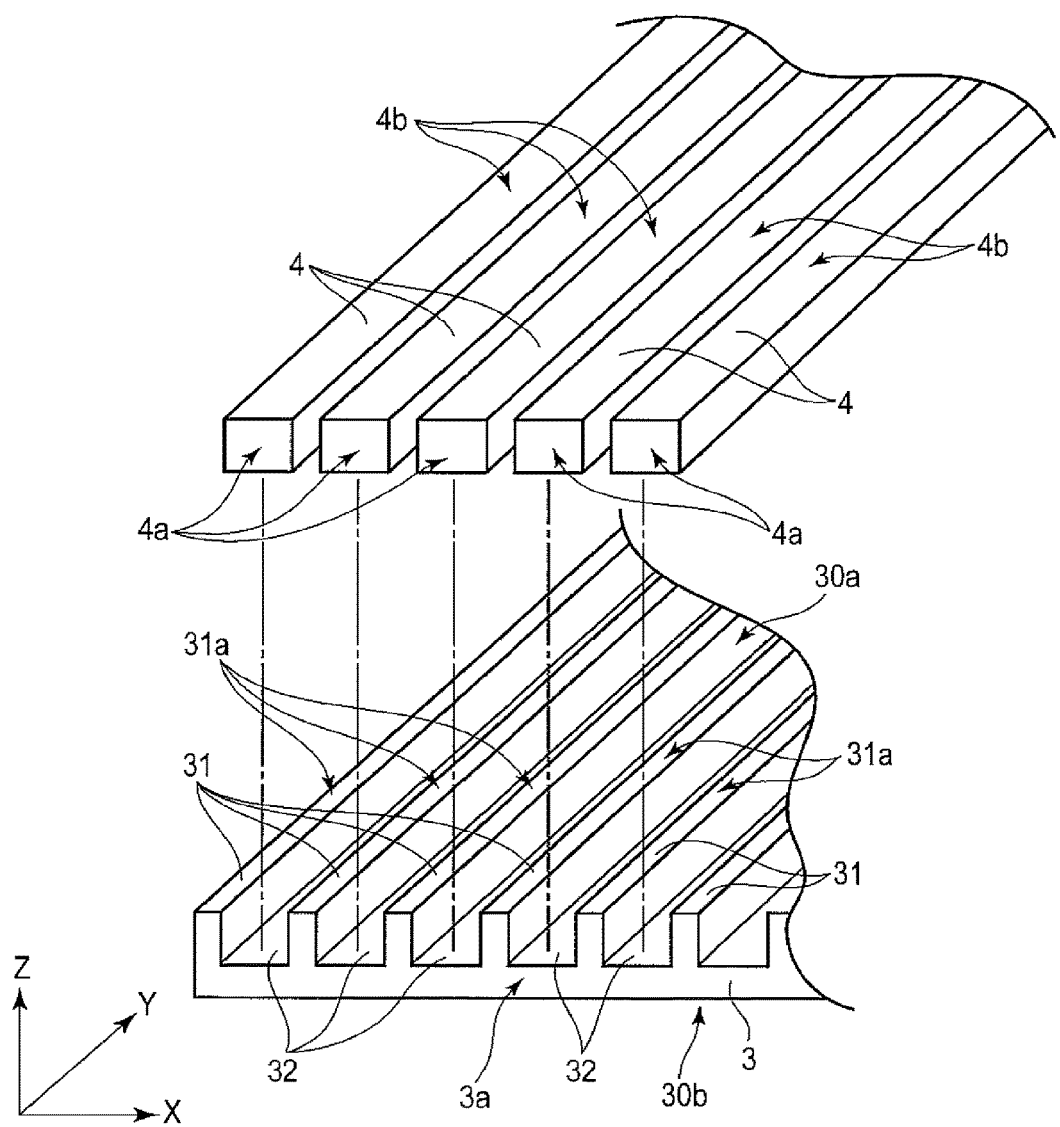
F I G. 5

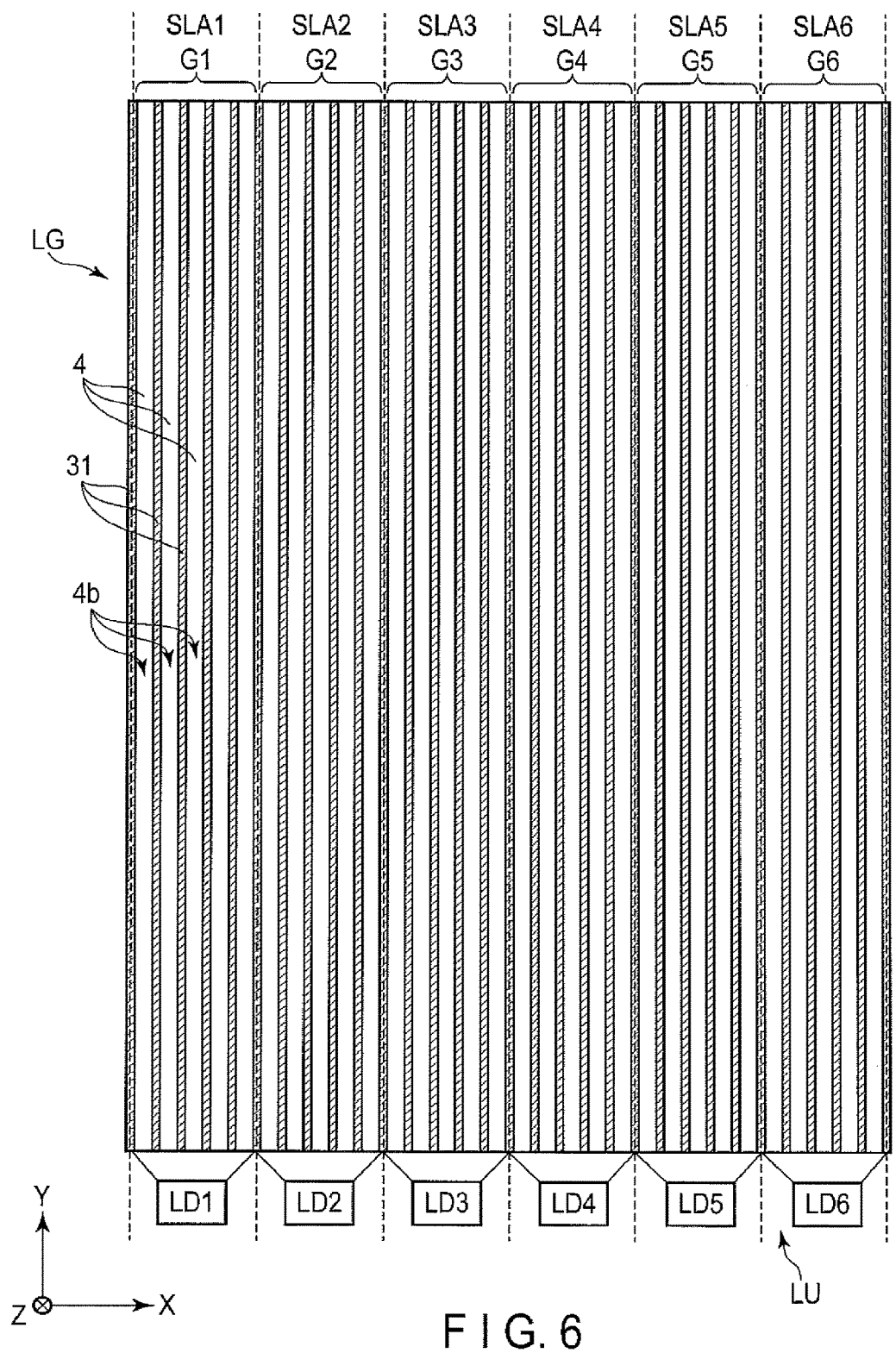
F I G. 6

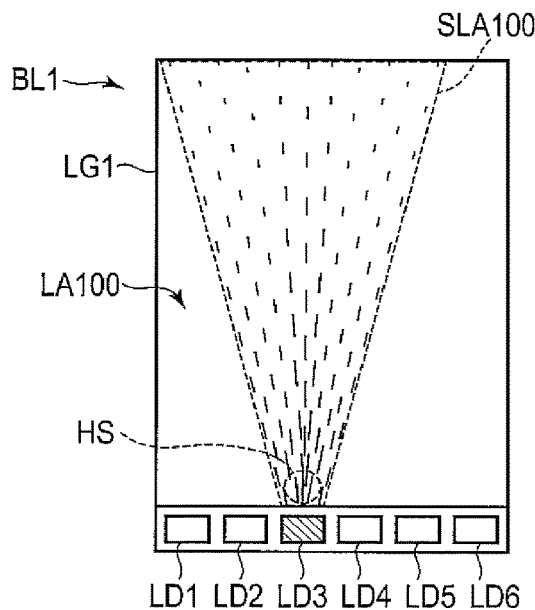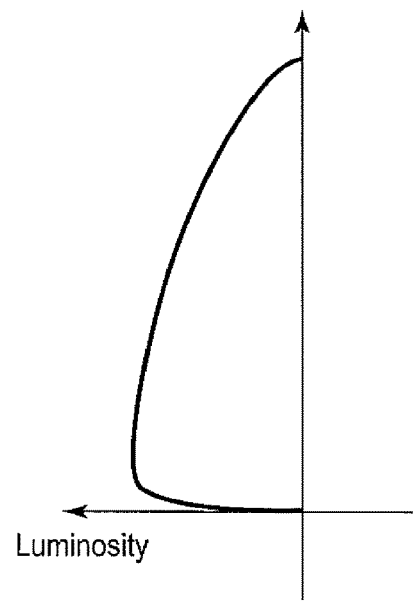
F I G. 7A  F I G. 7B
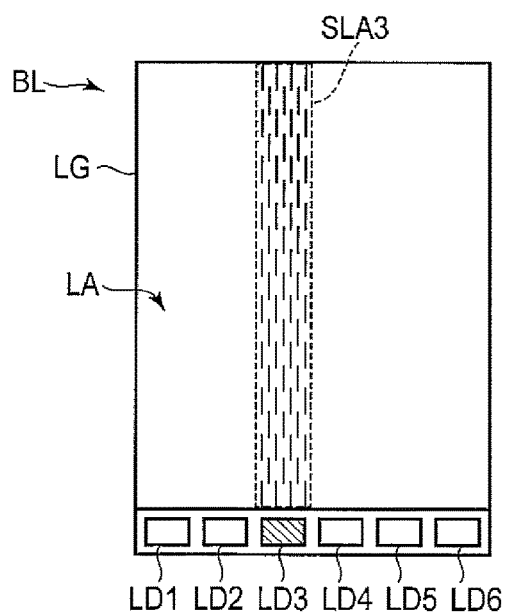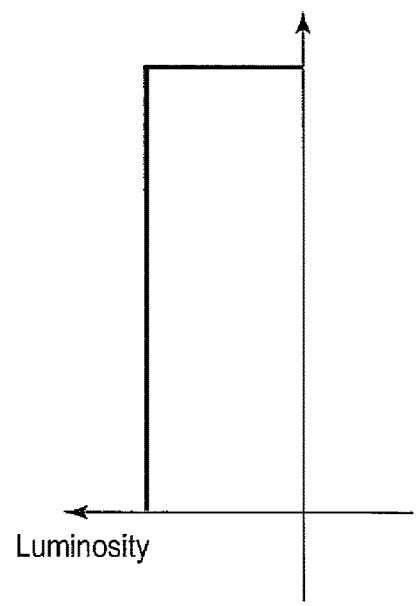
F I G. 8A  F I G. 8B

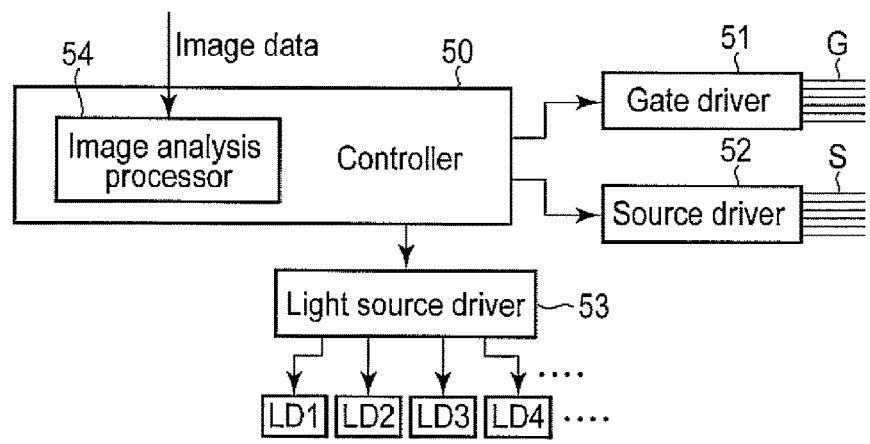
F I G. 9
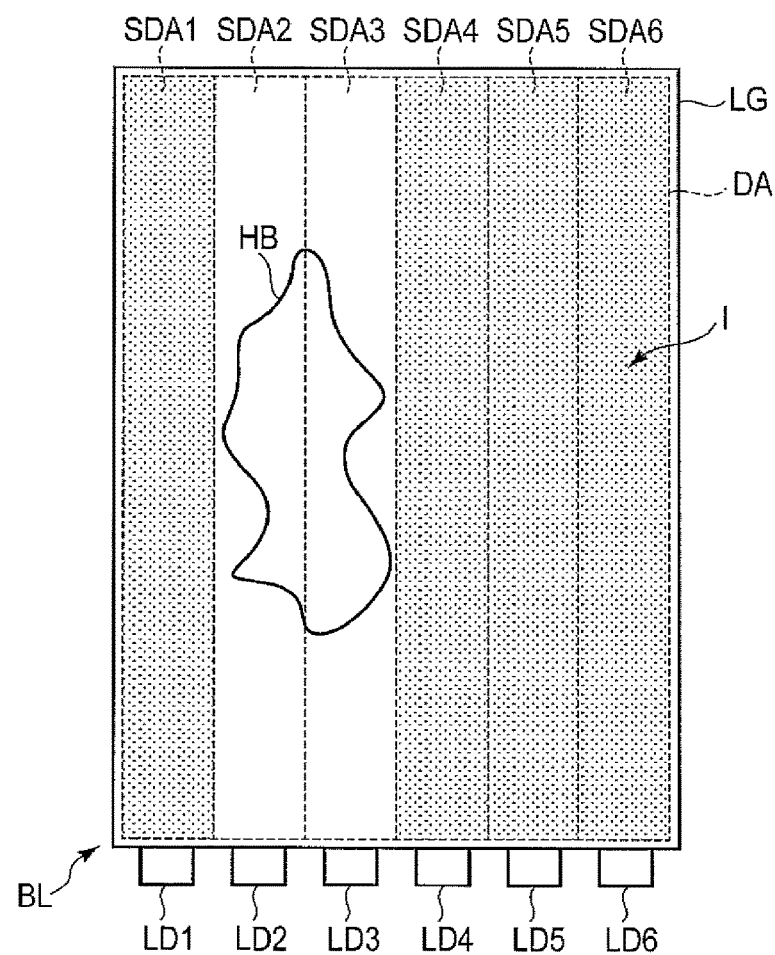
F I G. 10

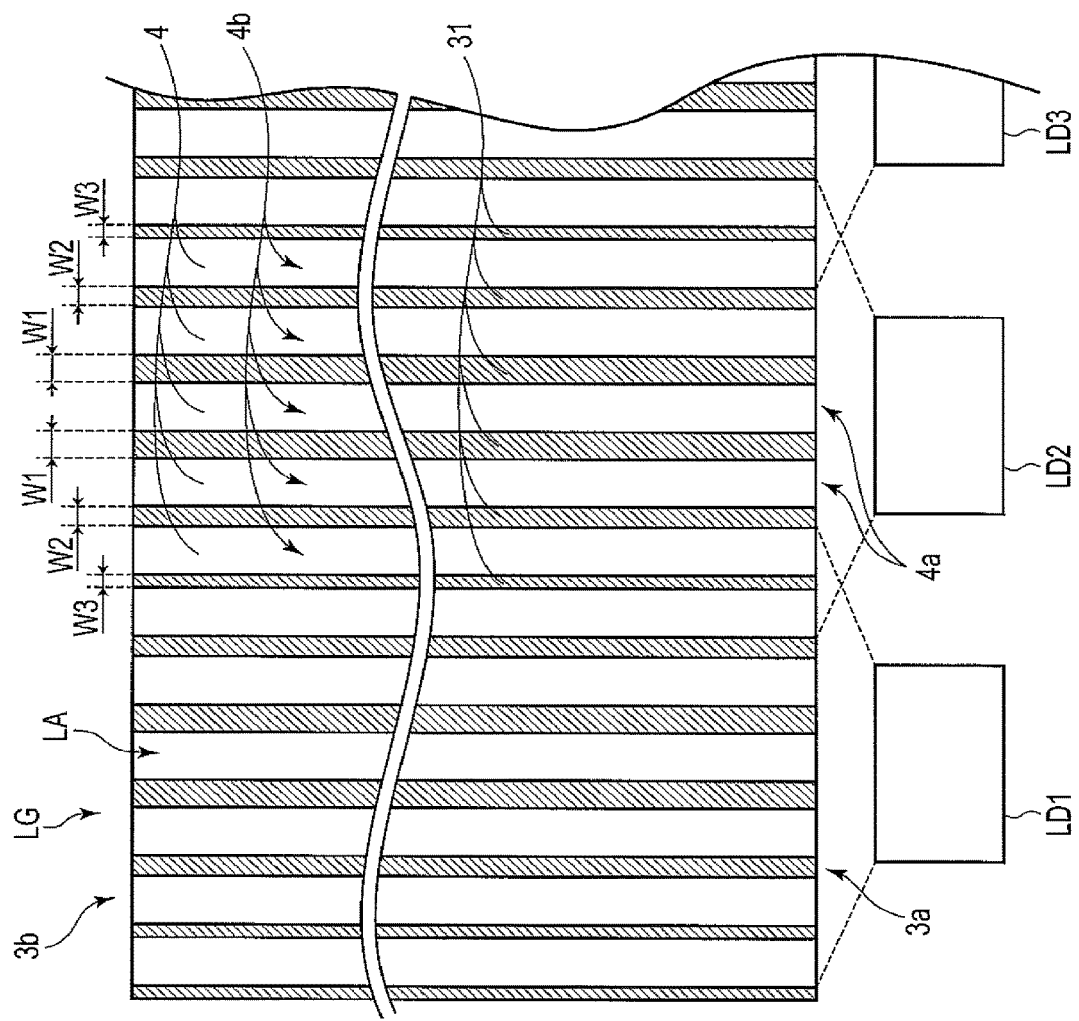
F I G. 12

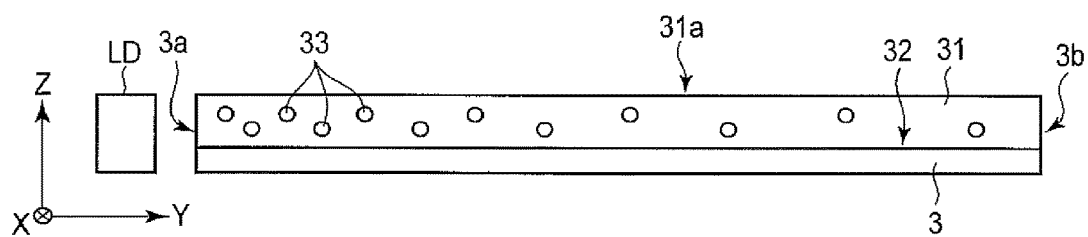
F I G. 13

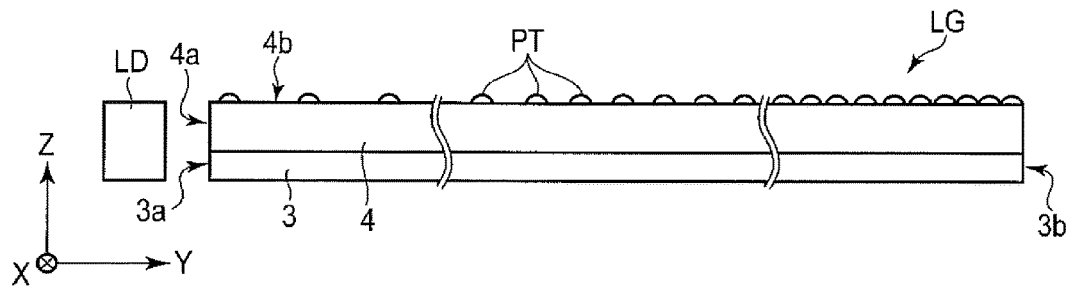
F I G. 15
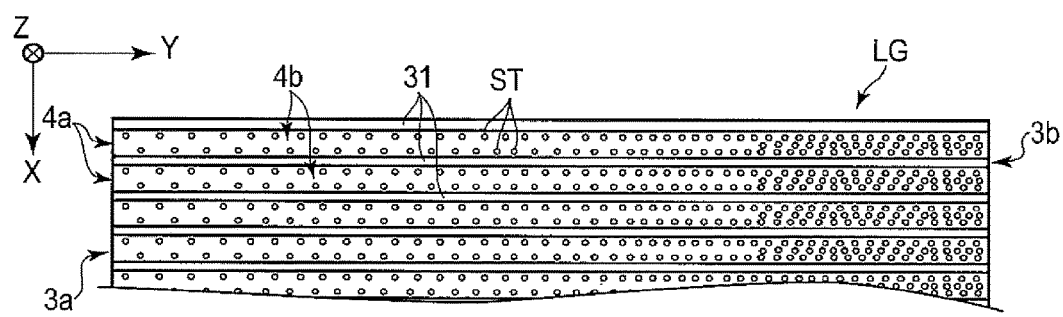
F I G. 16
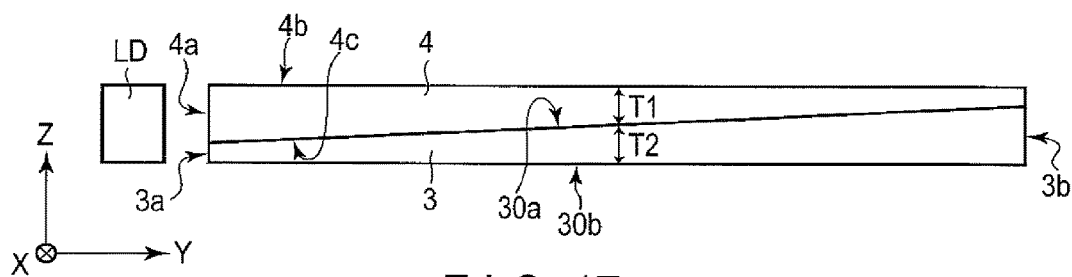
F I G. 17

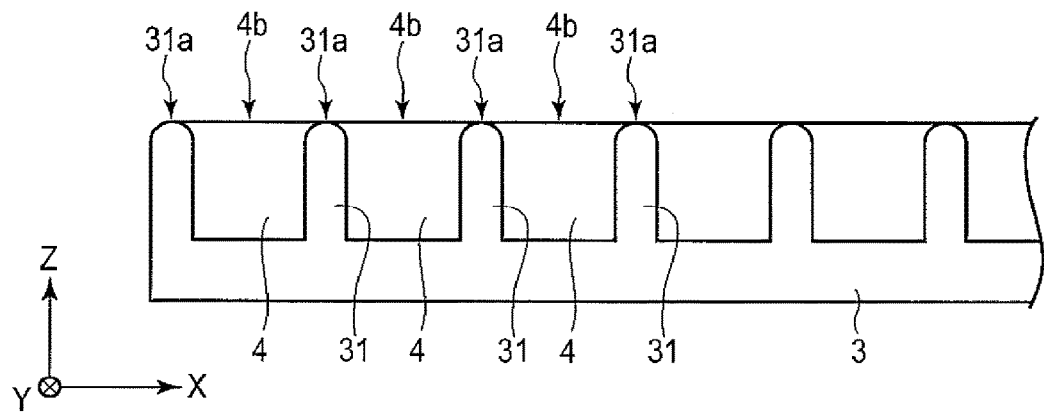
F I G. 18
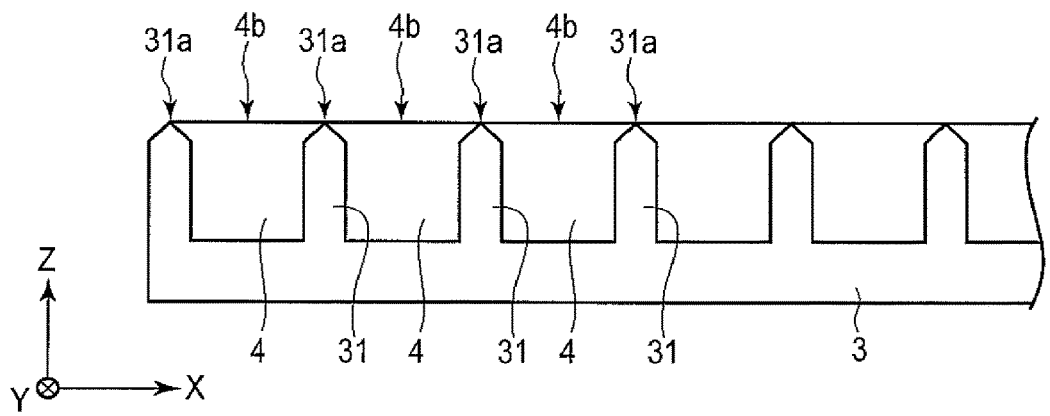
F I G. 19

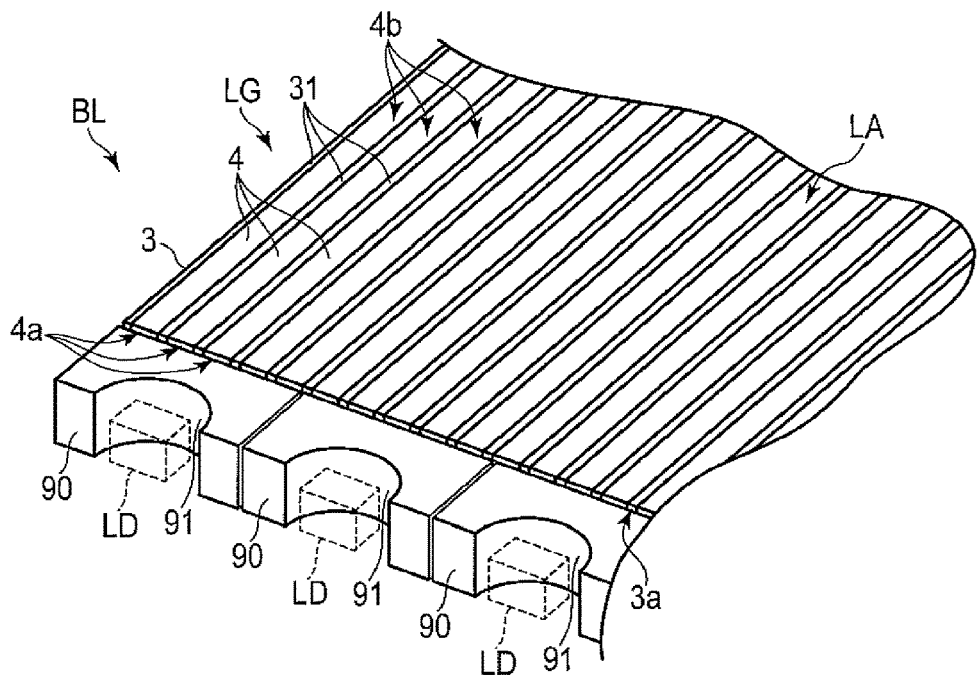
F I G. 20
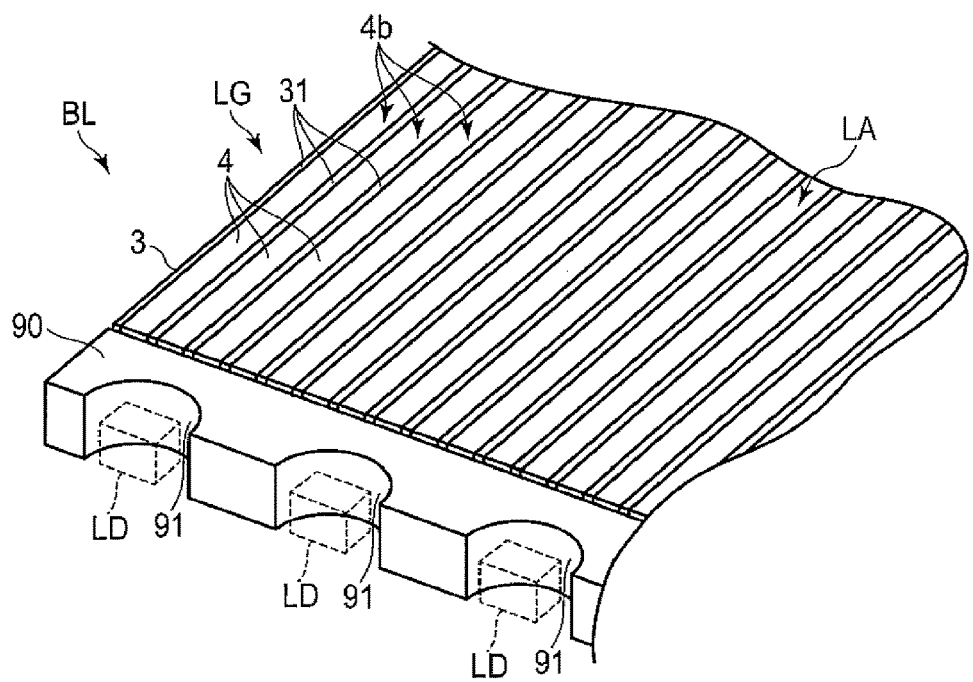
F I G. 21

DISPLAY DEVICE WITH FIRST MEMBER HAVING A PLURALITY OF PARTITIONS AND A PLURALITY OF SECOND MEMBERS, EACH SECOND MEMBER DISPOSED IN BETWEEN ADJACENT PARTITIONS

CROSS REFERENCES TO RELATED APPLICATIONS

The present application is a continuation application of U.S. patent application Ser. No. 14/837,342, filed on Aug. 27, 2015, which application claims priority to Japanese Priority Patent Application JP 2014-174306 filed in the Japan Patent Office on Aug. 28, 2014, the entire content of which is hereby incorporated by reference.

FIELD

Embodiments described herein relate generally to an illumination device and a display device.

BACKGROUND

There are known illumination devices including a light source and a light guide having an incident surface on which light from the light source is incident and an exit surface from which the incident light exits. Such illumination devices are used as a backlight of display devices such as a liquid crystal display device.

The light from the light source is incident on the light-guide and propagates in the light-guide spreading radially therein, and the light attenuates with distance from the light source. Therefore, the luminosity distribution on the exit surface of the light-guide becomes uneven such that, for example, the luminosity becomes stronger in the proximity of the light source and weaker with distance from the light source.

The unevenness in the luminosity distribution causes various problems depending on how the illumination devices are used. For example, if the illumination device is used as a backlight of a display device, the unevenness of the luminosity distribution may deteriorate the display quality.

Each embodiment aims an illumination device which can suppress unevenness in the luminosity distribution and a display device of excellent display quality.

SUMMARY

This application relates generally to an illumination device and a display device.

In an embodiment, an illumination device comprising a light source; a clad including a first edge at a light source side, a second edge opposite to the first edge, and a plurality of grooves formed by a plurality of partitions extending in parallel to each other from the first edge to the second edge; and a plurality of cores accommodated in the grooves, each core including an incident surface on which light from the light source is incident and an exit surface exposed from the groove to emit the light incident on the incident surface.

In a further embodiment, A display device comprising a first light source and a second light source aligned in a first direction; a clad including a first groove and a second groove formed by a plurality of partitions each extending in a second direction crossing the first direction; a first core accommodated in the first groove, the first core including a first incident surface on which light from the first light source is incident and a first exit surface exposed from the first groove to emit the light incident from the first incident surface; a second core accommodated in the second groove, the second core including a second incident surface on which light from the second light source is incident and a second exit surface exposed from the second groove to emit the light incident from the second incident surface; a display panel including a display area with a first area opposed to the first core and a second area opposed to the second core; and a controller configured to control luminosity of the first light source and luminosity of the second light source individually.

Additional features and advantages are described herein, and will be apparent from the following Detailed Description and the figures.

BRIEF DESCRIPTION OF THE FIGURES

FIG. 1 is a perspective view which schematically shows the structure of a display device of a first embodiment.

FIG. 5 shows a clad and cores of a light-guide of the backlight shown in FIG. 4 in an enlarged manner.

FIG. 6 schematically shows an example of a positional relationship between light-emitting diodes of the backlight and cores of a light-guide.

FIG. 7A shows a backlight of a comparative example as to the first embodiment.

FIG. 7B shows luminosity distribution in the backlight of the comparative example as a graph.

FIG. 8A schematically shows the backlight of the first embodiment for explanation of an effect of the first embodiment.

FIG. 8B shows luminosity distribution of the backlight of FIG. 8A as a graph.

FIG. 9 schematically shows a part of control components of the display device.

FIG. 10 shows an example of a determination method of luminosity of the light-emitting diodes.

FIG. 12 shows an example of clad shape improvement in the second embodiment.

FIG. 13 shows a structural example of a variation of the second embodiment.

FIG. 15 shows a structural example of a fourth embodiment.

FIG. 16 shows a structural example of a fifth embodiment.

FIG. 17 shows a structural example of a sixth embodiment.

FIG. 18 shows a structural example of a seventh embodiment.

FIG. 19 shows another structural example of the seventh embodiment.

FIG. 20 shows a structural example of an eighth embodiment.

FIG. 21 shows another structural example of the eighth embodiment.

DETAILED DESCRIPTION

Figure 2:
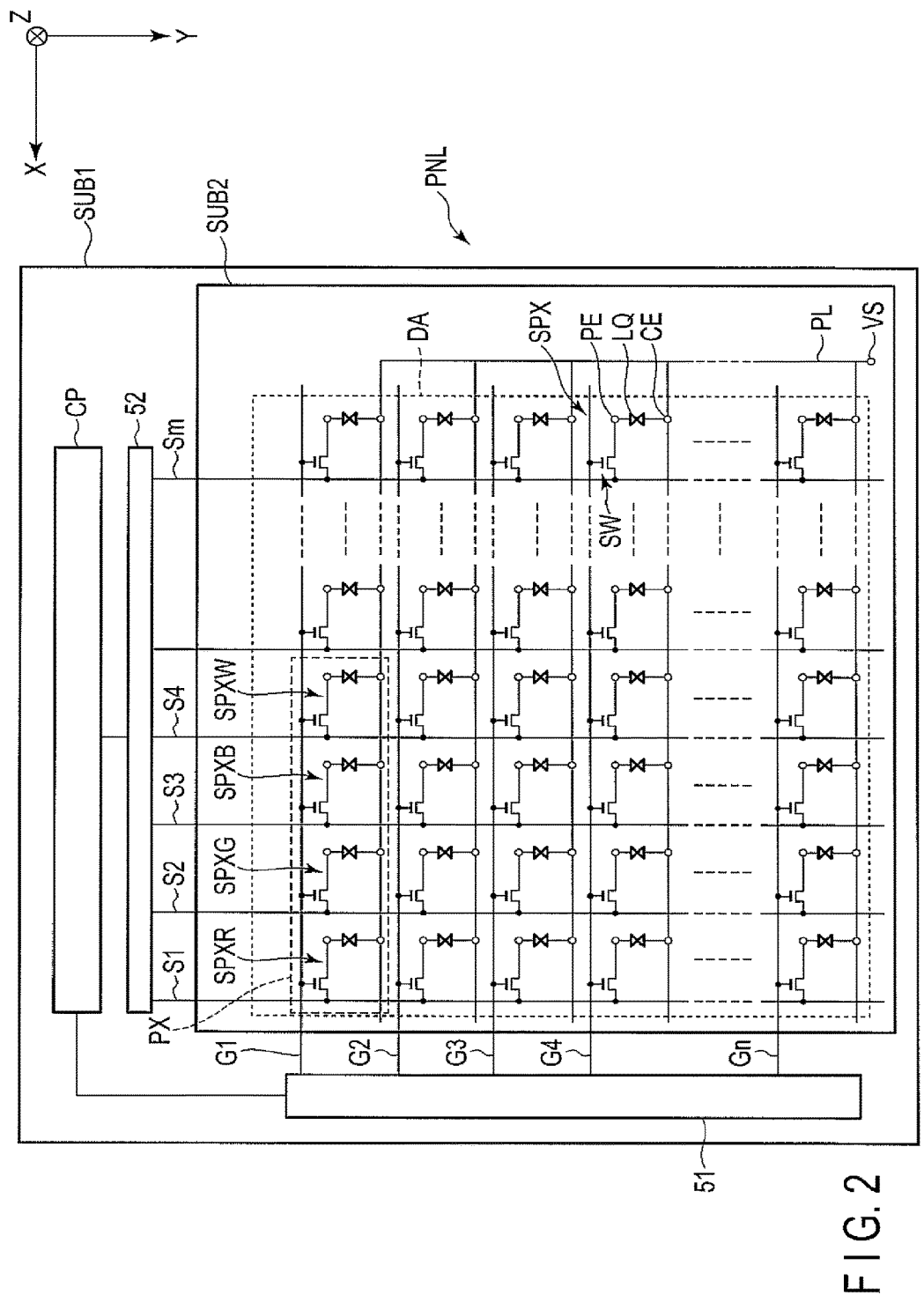
FIG. 2 schematically shows the structure of a liquid crystal display panel of the display device and an example of an equivalent circuit.

Embodiments are described with reference to accompanying drawings. Note that the disclosure is presented for the sake of exemplification, and any modification and variation conceived within the scope and spirit of the invention by a person having ordinary skill in the art are naturally encompassed in the scope of invention of the present application. Furthermore, the width, thickness, shape, and the like of each element are depicted schematically in the Figures as compared to actual embodiments for the sake of simpler explanation, and they are not to limit the interpretation of the invention of the present application. Furthermore, in the description and figures of the present application, structural elements having the same or similar functions will be referred to by the same reference numbers and detailed explanations of them that are considered redundant may be omitted.

In each of the following first to eighth embodiments, a display device is a liquid crystal display device and an illumination device is a backlight of the liquid crystal display device. For example, the liquid crystal display device can be used in various devices such as smartphones, tablet terminals, mobilephones, notebook computers, TVs, automobiles (in-car devices), and gaming devices. Note that the display device is not limited to the liquid crystal display device and may be a different kind of display device which includes an illumination device, such as a micro electro mechanical systems (MEMS) applied display device.

(First Embodiment)

FIG. 1 is a perspective view which schematically shows the structure of a liquid crystal display device LCD of a first embodiment in a disassembled manner.

A liquid crystal display device LCD includes an active matrix type liquid crystal display panel PNL. In the example of FIG. 1, the liquid crystal display panel PNL is formed in a rectangular shape having its short sides along a first direction X and long sides along a second direction Y which is orthogonal to the first direction X.

The liquid crystal display device LCD further includes a double-sided tape TP, optical sheet OS, frame FR, light-guide LG, light source unit LU, reflective sheet RS1, and bezel BZ. The backlight BL is composed of at least the light-guide LG and the light source unit LU and illuminates the liquid crystal display panel PNL. The backlight BL is an example of an illumination device and may be referred to as a surface light source device.

The liquid crystal display panel PNL includes a plate-like first substrate SUB1, plate-like second substrate SUB2 opposed to the first substrate SUB1, and a liquid crystal layer held between the first substrate SUB1 and the second substrate SUB2.

The liquid crystal display panel PNL has a display area DA which displays an image within an area defined by the first substrate SUB1 and the second substrate SUB2 opposed to each other. The liquid crystal display panel PNL is of transmissive type having a transmissive display function to display an image by selectively transmitting the light from the backlight EL. Note that the liquid crystal display panel PNL may be of transflective type having a reflective display function to display an image by selectively reflecting external light in addition to the transmissive display function.

In the example depicted, a driver IC chip CP and a flexible printed circuit FPC are mounted on the first substrate SUB1 as signal suppliers used to supplement of signals necessary for drive of the liquid crystal display panel PNL.

The optical sheet OS is light transmissive and is disposed at the rear surface side of the liquid crystal display panel PNL to be opposed to at least the display area DA. The optical sheet OS includes a diffusion sheet OSA, prism sheet OSB, prism sheet OSC, and diffusion sheet OSD. In the example depicted, the sheets OS are each formed in a rectangle.

The frame FR is disposed between the liquid crystal display panel PNL and the bezel BZ. In the example depicted, the frame FR is formed in a rectangular frame having a rectangular opening OP opposed to the display area DA.

The double-sided tape TP is disposed between the liquid crystal display panel PNL and the frame FR outside the display area DA. The double-sided tape TP has a light-shielding property, for example, and is formed in a rectangular frame-like shape to attach the liquid crystal display panel PNL and the frame FR together.

The light-guide LG is disposed between the frame FR and the bezel BZ. In the example depicted, the light-guide LG is formed in a plate-like shape having a light-emitting surface LA opposed to the liquid crystal display panel PNL. Note that, the light-guide LG is not necessarily formed in a uniformly flat plate shape. For example, the light-guide LG may be tapered in the proximity of the light source unit LU such that the light-emitting surface LA is slanted to gradually decrease its thickness as departing from the light source unit LU. With this structure, a space in which the optical sheet OS is arranged can be formed on the light-emitting surface LA.

The light source unit LU is disposed along the side surface of the light-guide LG. The light source unit LU includes a plurality of light-emitting diodes LD arranged in the first direction X and a flexible circuit LFPC on which the light-emitting diodes LD are mounted. The light source unit LU may include a different kind of light source such as an organic electroluminescent device instead of the light-emitting diodes LD.

Reflective sheet RS1 is light reflective and opposed to the rear surface of the light-guide LG (the surface opposite to the light-emitting surface LA). In the example depicted, reflective sheet RS1 is formed in a rectangle.

The liquid crystal display panel PNL, double-sided tape TP, optical sheet OS, light-guide LG, and reflective sheet RS1 are layered in this order in a third direction Z which crosses the first direction X and the second direction Y orthogonally, and are accommodated by the bezel BZ.

The bezel BZ further accommodates the frame FR and the light source unit LU. For example, the optical sheet OS and the light-guide LG are positioned inside the opening OP of the frame FR within the bezel BZ.

In the example depicted FIG. 1, the liquid crystal display panel PNL and the frame FR are adhered by the double-sided tape TP; however, the adhesion of the liquid crystal display panel PNL and the frame FR may be performed by a different type adhesion layer. For example, an opening OP may be omitted from the frame FR such that the frame FR and the liquid crystal display panel PNL are adhered to each other by a transparent adhesion layer placed to include the inner side of the display area DA. Alternately, a frame body to fix the liquid crystal display panel PNL and the backlight BL may be adopted instead of the double-sided tape TP and the adhesion layer to fix the position of the liquid crystal display panel PNL and the backlight BL. Note that the optical sheet OS and the frame FR are not essential and the liquid crystal display panel PNL and the backlight BL may be adhered to each other directly.

Furthermore, in the example depicted in FIG. 1, the liquid crystal display panel PNL, optical sheet OS, opening OP, and the like are each formed in a rectangular shape; however, the shape thereof may be changed to any other polygonal shapes such as square, or circular shape, or the like.

FIG. 2 schematically shows the structure of the liquid crystal display panel PNL and an example of an equivalent circuit. The liquid crystal display panel PNL includes a plurality of gate lines G (G1 to Gn, n is a positive integer) extending in parallel to the first direction X, a plurality of source lines S (S1 to Sm, m is a positive integer) extending in parallel to the second direction Y, and a plurality of subpixels SPX arranged in an n×m matrix. Note that the subpixels SPX each correspond to regions defined by the source lines S and the gate lines G, for example.

A subpixel SPX includes a switching element SW electrically connected to both the gate line G and the source line S and a pixel electrode PE electrically connected to the switching element SW. The pixel electrode PE is opposed to a common electrode CE via a liquid crystal layer LQ interposed between first substrate SUB1 and second substrate SUB2.

A pixel PX is a minimum unit to achieve color display and is composed of a plurality of subpixels SPX. For example, a pixel PX includes subpixels SPXR, SPXG, SPXB, and SPXW which correspond to red, green, blue, and white, respectively. The subpixels SPX correspond to different pixel electrodes PE. In the example of FIG. 2, subpixels SPXR, SPXG, SPXB, and SPXW are arranged to be parallel to the first direction X. The layout of subpixels SPXR, SPXG, SPXB, and SPXW which are components of a pixel PX is not limited to the example of FIG. 2, and four subpixels SPXR, SPXG, SPXB, and SPXW may not be arranged in the same direction. Furthermore, a pixel PX may not include a subpixel SPXW which corresponds to white but may include a subpixel SPX of different color such as yellow.

Each gate line G is drawn outside the display area DA to be connected to a gate driver 51. Each source line S is drawn outside the display area DA to be connected to a source driver 52. The common electrode CE is electrically connected to a voltage supplier VS which supplies a common voltage through a power line PL. The gate driver 51 and the source driver 52 are formed as integral circuits in the first substrate SUB1 and are connected to the driver IC chip CP.

Figure 3:
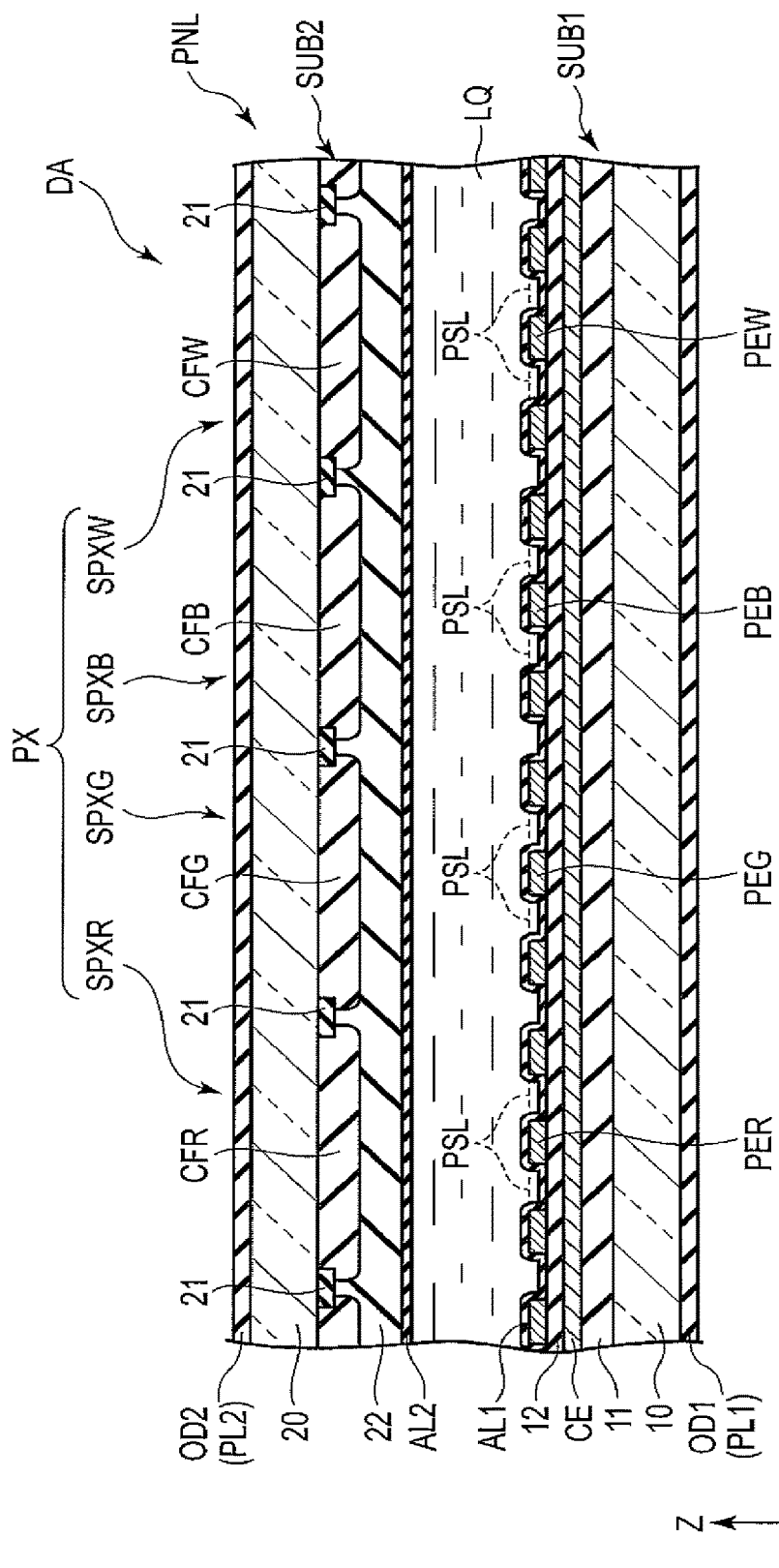
FIG. 3 is a cross-sectional view which schematically shows a structural example of the liquid crystal display panel.

FIG. 3 is a cross-sectional view which schematically shows a structural example of the liquid crystal display panel PNL. In the figure, the structure of a pixel PX including subpixels SPXR, SPXG, SPXB, and SPXW is focused.

As mentioned above, the liquid crystal display panel PNL includes the first substrate SUB1, second substrate SUB2 opposed to the first substrate SUB1, and liquid crystal layer LQ interposed between the first substrate SUB1 and the second substrate SUB2.

The first substrate SUB1 includes a first insulating substrate 10 which is a light transmissive glass substrate or resin substrate, first insulating layer 11 covering the inner surface of the first insulating substrate 10 (the surface at the second substrate SUB2 side), common electrode CE disposed on the first insulating layer 11, and second insulating layer 12 covering the common electrode CE. Note that an insulating layer may be disposed on the pixel electrode PE and the common electrode CE may be disposed on the insulating layer.

Furthermore, the first substrate SUB1 includes pixel electrodes PER, PEG, PEB, and PEW which correspond to subpixels SPXR, SPXG, SPXB, and SPXW, respectively, and a first alignment film AL1 which covers pixel electrodes PER, PEG, PEB, and PEW and the second insulating layer 12 and contacts the liquid crystal layer LQ. The common electrode CE faces pixel electrodes PER, PEG, PEB, and PEW with the second insulating layer 12 interposed therebetween. In the example of FIG. 3, pixel electrodes PER, PEG, PEB, and PEW have a plurality of slits PSL.

The common electrode CE and pixel electrodes PER, PEG, PEB, and PEW are formed of a transparent conductive material such as indium tin oxide (ITO) or indium zinc oxide (IZO).

The second substrate SUB2 includes a second insulating substrate 20 which is a light transmissive glass substrate or resin substrate, color filters CER, CFG, CFB, and CFW disposed on the inner surface of the second insulating substrate 20 (the surface at the first substrate SUB1 side), and black matrix 21.

Color filter CFR is a red filter which is disposed at a red subpixel SPXR and is formed of a red colored resin material. Color filter CFG is a green filter which is disposed at a green subpixel SPXG and is formed of a green colored resin material. Color filter CFB is a blue filter which is disposed at a blue subpixel SPXB and is formed of a blue colored resin material. Color filter CFW is a white filter which is disposed at a white subpixel SPXW and is formed of a white colored resin material. Note that color filter CFW may be formed of a transparent resin material or color filter CFW itself may not be disposed at a position corresponding to a white subpixel SPXW.

In the example of FIG. 3, color filters CER, CFG, CFB, and CFW are provided with the second substrate SUB2; however, color filters CER, CFG, CFB, and CFW may be provided with the first substrate SUB1.

The black matrix 21 defines subpixels SPXR, SPXG, SPXB, and SPXW. Boundaries of color filters CER, CFG, CFB, and CFW are positioned on the black matrix 21. Note that, a light shielding layer may be formed instead of such a black matrix 21 by overlaying edges of adjacent color filters one on another (such as CFR and CFG, CFG and CFB, and CFB and CFW).

The second substrate SUB2 further includes an overcoat layer 22 which covers color filters CER, CFG, CFB, and CFW and the black matrix 21, and a second alignment film AL2 which covers the overcoat layer 22 and contacts the liquid crystal layer LQ.

A first optical element OD1 including a first polarizer plate PL1 is disposed on the external surface of the first insulating substrate 10 (the surface at the backlight BL side). Furthermore, a second optical element OD2 including a second polarizer plate PL2 is disposed on the external surface of the second substrate SUB2 (the surface opposite to the first substrate SUB1).

The structure of FIG. 3 can be applied to, for example, a liquid crystal display panel PNL of a transverse field mode which uses a transverse field substantially parallel to the main surface of the substrate in switching of liquid crystal molecules. A structure in which pixel electrodes PER, PEG, PEB, and PEW and the common electrode CE are arranged on the same layer or a structure in which the common electrode CE is arranged closer to the liquid crystal layer LQ side as compared to pixel electrodes PER, PEG, PEB, and PEW can be applied to the liquid crystal display panel PNL of transverse field mode.

The mode of the liquid crystal display panel PNL is not limited to transverse field mode, but may be vertical field mode, which uses a vertical field normal to the substrate surface in switching of liquid crystal molecules, such as twisted nematic (TN) mode and vertically aligned (VA) mode.

Next, the backlight BL will be explained.

Figure 4:
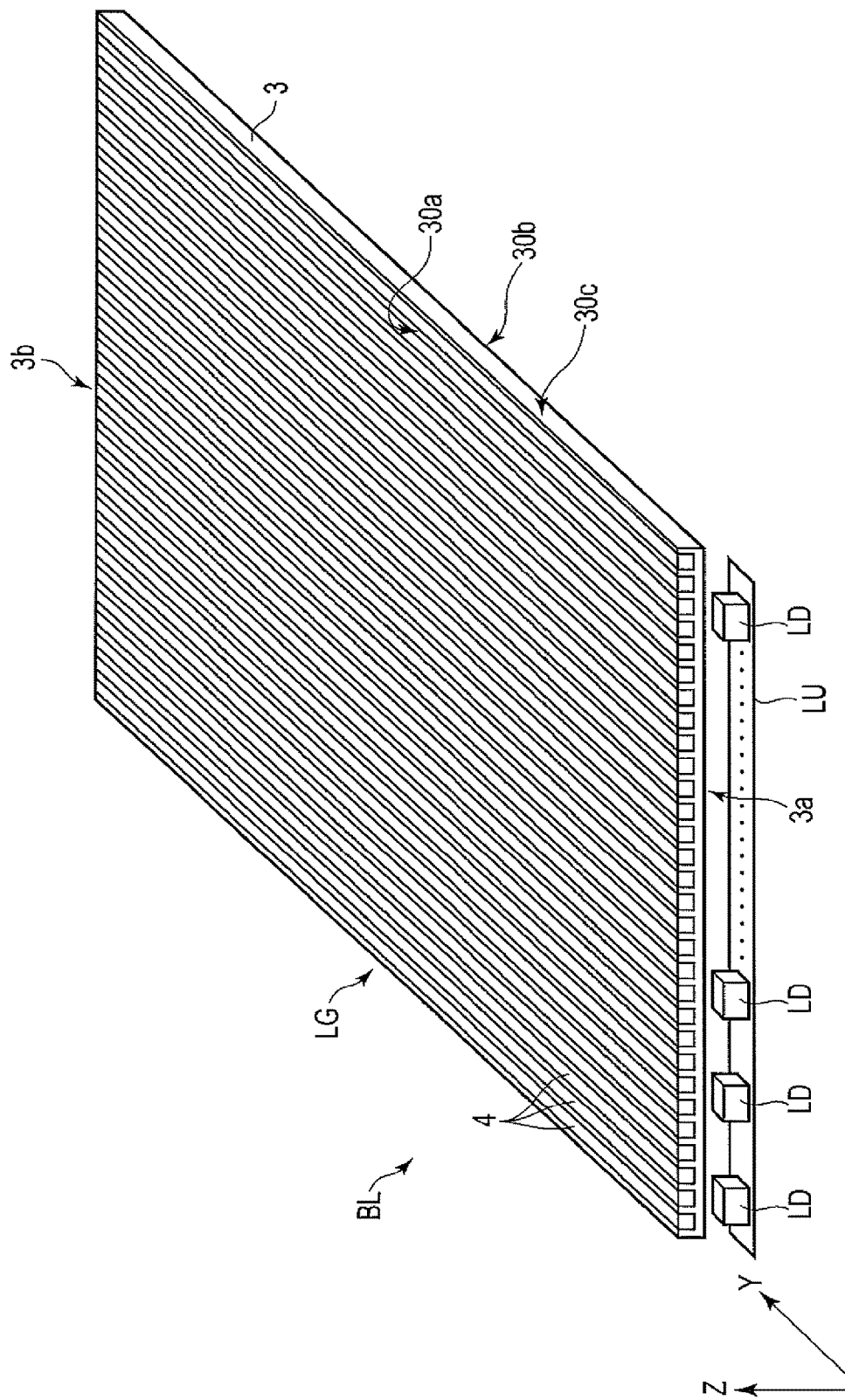
FIG. 4 schematically shows a structural example of a backlight of the display device.

FIG. 4 schematically shows a structural example of the backlight BL. The light-guide LG includes a clad 3 and a plurality of cores 4. The clad 3 is formed of a first material having a first refractive index. Cores 4 are formed of a second material having a second refractive index which is greater than the first refractive index. The first and second materials may be a quartz glass, multicomponent glass, and plastic, for example.

The clad 3 is formed in a rectangular flat plate-like shape having a first edge 3a along the light source unit LU (and the first direction X) and a second edge 3b opposite to the first edge 3a. In the example of FIG. 4, the first edge 3a and the second edge 3b correspond to the short sides of the light-guide LG.

More specifically, the clad 3 includes a first surface 30a facing the liquid crystal display panel PNL, a second surface 30b opposite to the first surface 30a, and side surface 30c which connects the first surface 30a to the second surface 30b.

Each core 4 extends in a slender shape along the second direction Y between the first edge 3a and the second edge 3b, and cores 4 are parallel to each other at certain intervals along the first direction X, and are disposed at the first surface 30a side.

FIG. 5 shows the clad 3 and cores 4 in FIG. 4 in an enlarged manner. FIG. 5 schematically shows a part of the clad 3 and a part of cores 4 in a disassembled manner. The clad 3 includes a plurality of partitions 31 projecting in the third direction Z on the first surface 30a. Partitions 31 extend in parallel to each other along the second direction Y between the first edge 3a and the second edge 3b in FIG. 4, and are arranged with certain intervals along the first direction X. In the example shown in FIG. 5, both the width in the first direction X and the height in the third direction Z of each partition 31 are the same.

Two adjacent partitions 31 form a groove 32. In other words, the clad 3 includes a plurality of grooves 32 extending in the second direction Y and arranged at certain intervals along the first direction X.

A single core 4 is disposed in one groove 32. For example, a cross-section of core 4 parallel to X-Z plane is a uniform rectangle from the first edge 3a to the second edge 3b. Each core 4 fits in the groove 32 and the surface of the core 4 and the inner surface of the groove 32 are tightly adhered to each other.

As being accommodated in the groove 32, the side surface of the core 4 at the first edge 3a side which faces the light source unit LU and the upper surface in the third direction Z (the surface facing the liquid crystal display panel PNL) are exposed. That is, the side surface exposed from the groove 32 is an incident surface 4a on which light from the light-emitting diodes LD is incident and the upper surface exposed from the groove 32 is an exit surface 4b from which light incident on the incident surface 4a exits.

As in the example of FIG. 4, the side surface of the core 4 at the second edge 3b side may be exposed from the groove 32 or may be covered with a part of the clad 3. If the side surface of the core 4 at the second edge 3b side is covered by a part of the clad 3, the light propagating in the core 4 is reflected by the boundary between the side surface and the clad 3 and light loss can be decreased.

The light incident upon the incident surface 4a enters the core 4, propagates in the core 4, and exits from the exit surface 4b. Since the refractive index of the clad 3 is lower than that of the core 4, the light propagating in the core 4 is totally reflected at the boundary between the core 4 and the clad 3.

For example, when the core 4 is accommodated in the groove 32, the top 31a of the partition 31 is flush with the exit surface 4b of the core 4. That is, the tops 31a of the partition 31 and the exit surfaces 4b of the cores 4 form the light-emitting surface LA of the light-guide LG.

The light-guide LG described above can be manufactured through a coinjection molding (double molding) process. In this process, a first mold corresponding to the shape of the clad 3 is used to form the clad 3 with a first material having a first refractive index. Then, the clad 3 is covered with a second mold and cores 4 are formed inside the grooves 32 with a second material having a second refractive index corresponding to the shape of the core 4. Through this step, the core 4 is thermally fused with the inner wall of the groove 32. Through such a coinjection molding process, the light-guide LG can be manufactured accurately and easily. Furthermore, as compared to using molding processes to form the clad 3 and the cores 4 separately, the manufacturing performance of the light-guide LG can be improved and the manufacture cost can be reduced.

Note that the light-guide LG is not necessarily manufactured through a coinjection process and may be manufactured by any other method such as a nano-imprint process. Furthermore, the shape of the clad 3 is not limited to a rectangular shape as in FIG. 4 and may be any polygonal shape including a square or a circular shape. Additionally, by slanting the partitions 31 of the clad 3 and the exit surface 4b of the cores 4, the light-guide LG may be tapered as described above.

FIG. 6 schematically shows an example of a positional relationship between the light-emitting diodes LD of the light source unit LU and the cores 4 of the light-guide LG. In the example depicted, the light source unit LU includes six light-emitting diodes LD (LD1 to LD6). Light-emitting diodes LD1, LD2, LD3, LD4, LD5, and LD6 are arranged along the first direction X in this order.

In the example of FIG. 6, the light-guide LG includes thirty cores 4. The light from light-emitting diode LD1 is incident on the first to fifth cores 4 on the left. The light from light-emitting diode LD2 is incident on the sixth to tenth cores 4 from the left. The light from light-emitting diode LD3 is incident on the eleventh to fifteenth cores 4 from the left. The light from light-emitting diode LD4 is incident on the sixteenth to twentieth cores 4 from the left. The light from light-emitting diode LD5 is incident on the twenty first to twenty fifth cores 4 from the left. The light from light-emitting diode LD6 is incident on the twenty sixth to thirty cores 4 from the left.

In the description below, the five cores 4 on which the light from light emitting diode LD1 is incident are referred to as group G1, the five cores 4 on which the light from light-emitting diode LD2 is incident are referred to as group G2, the five cores 4 on which the light from light-emitting diode LD3 is incident are referred to as group G3, the five cores 4 on which the light from light-emitting diode LD4 is incident are referred to as group G4, the five cores 4 on which the light from light-emitting diode LD5 is incident are referred to as group G5, and the five cores 4 on which the light from light-emitting diode LD6 is incident are referred to as group G6.

Furthermore, in the light-emitting surface LA, an area formed of the exit surface 4b of the cores 4 of group G1 is referred to as sub-light-emitting area SLA1, an area formed of the exit surface 4b of the cores 4 of group G2 is referred to as sub-light-emitting area SLA2, an area formed of the exit surface 4b of the cores 4 of group G3 is referred to as sub-light-emitting area SLA3, an area formed of the exit surface 4b of the cores 4 of group G4 is referred to as a sub-light-emitting area SLA4, an area formed of the exit surface 4b of the cores 4 of group G5 is referred to as a sub-light-emitting area SLA5, and an area formed of the exit surface 4b of the cores 4 of group G6 is referred to as a sub-light-emitting area SLA6.

In this structure, the luminosity of the light-emitting surface LA of the light guide LG can be controlled in individual area of sub-light-emitting areas SLA1 to SLA6 by turning on/off light-emitting diodes LD1 to LD6 or adjusting the luminosity of light-emitting diodes LD1 to LD6 turned on. In the description below, such an area-by-area control is referred to as partial drive of the backlight BL.

The partial drive of the backlight BL will be explained with reference to FIGS. 7A and 7B and FIGS. 8A and 8B.

FIGS. 7A and 7B show a comparative example as to the present embodiment. FIG. 7A shows a backlight BL1 which includes a light-guide LG1 formed uniformly of the same material unlike the core-and-clad structure of the present application, and also includes light-emitting diodes LD1 to LD6 arranged along an edge of light-guide LG1.

In the example of FIG. 7A, only light-emitting diode LD3 is turned on and sub-light-emitting area SLA100 emits light in a light-emitting surface LA100 of light-guide LG1. Furthermore, the luminosity distribution in sub-light-emitting area SLA100 is represented by density of line segments in such a manner that the luminosity increases in proportion to the density.

Since light-guide LG1 is formed uniformly, sub-light-emitting area SLA100 spreads radially from the proximity of light-emitting diode LD3. The light incident on light-guide LG1 attenuates with distance from light-emitting diode LD3. Therefore, the luminosity of sub-light-emitting area SLA100 becomes lower with distance from light-emitting diode LD3. Furthermore, even if the distance from light-emitting diode LD3 is the same, the luminosity of sub-light-emitting area SLA100 becomes higher toward its center and becomes lower toward its side edges. As a result, a hot spot HS having significantly high luminosity as compared to the other part of sub-light-emitting area SLA100 may possibly be generated in the proximity of light-emitting diode LD3.

FIG. 7B shows the luminosity distribution in sub-light-emitting area SLA100 as a graph in which the horizontal axis indicates luminosity and the vertical axis indicates a distance from light-emitting diode LD3. As can be understood from the graph, the luminosity reaches its peak at the position corresponding to the hot spot HS and gradually decreases with distance from light-emitting diode LD3.

As can be understood from the above, if each sub-light-emitting area SLA spreads radially, the sub-light-emitting areas SLA overlap by turning on light-emitting diodes LD1 to LD6. Thus, areas for partial drive are difficult to define in light-emitting surface LA100. Furthermore, since the luminosity distribution in the sub-light-emitting areas SLA is uneven, the luminosity of the image displayed in the display area DA of the liquid crystal display panel PNL may become uneven.

On the other hand, FIGS. 8A and 8B show an effect of the present embodiment. FIG. 8A shows that light-emitting diode LD3 is turned on in the backlight BL as in the case of FIG. 7A. Since light-emitting diode LD3 is turned on, light is incident on the cores 4 of group G3 and sub-light-emitting area SLA3 emits light. The light incident on the cores 4 of group G3 propagates in the cores 4 while scarcely propagating in the other cores 4 of the other groups. Therefore, sub-light-emitting area SLA3 does not spread radially unlike sub-light-emitting area SLA100 of the comparative example of FIG. 7A. The same applies to other sub-light-emitting areas SLA1, SLA2, and SLA4 to 6. Since sub-light-emitting areas SLA1 to SLAG do not overlap, only a desired area in the light-emitting surface LA can be illuminated.

In the example of FIG. 8A, the luminosity distribution in sub-light-emitting area SLA3 is represented by the density of the line fragments as in the case of FIG. 7A. Furthermore, FIG. 8B shows the luminosity distribution in sub-light-emitting area SLA3 as a graph. In sub-light-emitting area SLA3, the light incident on the cores 4 of group G3 propagates totally reflected by the boundaries to the clad 3, and thus, the light attenuation scarcely occurs. Therefore, the luminosity in sub-light-emitting area SLA3 becomes substantially uniform regardless of a distance from light-emitting diode LD3 and a hot spot HS does not occur. Therefore, display quality of the image in the display area DA can be improved.

Now, an example of control of the partial drive of the backlight unit BL will be explained.

FIG. 9 is a block diagram which schematically shows a part of control components of the liquid crystal display device LCD. The liquid crystal display device LCD includes a controller 50, gate driver 51, source driver 52, and a light source driver 53 as its main control components.

The controller 50 may be composed of, for example, the drive IC chip CP as in FIG. 1, flexible printed circuit FPC, and electronic components mounted on the printed circuit board such as IC. The controller may comprise other elements such as an electrical components connected to the flexible printed circuit FPC.

The controller 50 successively receives image data per frame for the display in the display area DA from a main board or the like of an electronic device in which the liquid crystal display device LCD equipped. The image data include, for example, color data and brightness data used by each pixel PX of the display area DA for display. Based on the received image data, the controller 50 supplies signals to the gate driver 51 and the source driver 52 to drive the gate lines G (G1 to Gn) and the source lines S (51 to Sm) connected to subpixels SPXR, SPXG, SPXB, and SPXW in the liquid crystal display panel PNL.

The gate driver 51 drives gate lines G selectively according to the signals supplied from the controller 50. The source driver 52 drives source lines S selectively according to the signals supplied from the controller 50. Subpixels in the liquid crystal display panel PNL are turned on and off individually by the drive of gate lines G and source lines S.

The controller 50 includes an image analysis processor 54. The image analysis processor 54 analyzes the image data received by the controller 50 and determines the luminosity of light-emitting diodes LD of the light source unit LU. The controller 50 supplies signals indicative of the luminosity determined by the image analysis processor 54 to the light source driver 53.

The light source driver 53 turns on each light-emitting diode LD with the luminosity indicated by the signals supplied from the controller 50 by adjusting the voltage supplied to the light-emitting diode LD. Note that, if there is a light-emitting diode LD of which luminosity is determined to be zero by the image analysis processor 54, the light source driver 53 does not turn on the light-emitting diode LD.

FIG. 10 shows an example of determination method of the luminosity of light emitting diodes LD by the image analysis processor 54, in which the backlight BL and the display area DA are depicted schematically. In the example depicted, six light-emitting diodes LD1 to LD6 are arranged along the edge of the light-guide LG as in the case of FIG. 6. That is, the light-emitting surface LA of the light-guide LG can perform partial drive of sub-light-emitting areas SLA1 to SLA6 area by area.

In the example of FIG. 10, the display area DA includes a sub-display area SDA1 opposed to sub-light-emitting area SLA1, sub-display area SDA2 opposed to sub-light-emitting area SLA2, sub-display area SDA3 opposed to sub-light-emitting area SLA3, sub-display area SDA4 opposed to sub-light-emitting area SLA4, sub-display area SDA5 opposed to sub-light-emitting area SLA5, and sub-display area SDA6 opposed to sub-light-emitting area SLA6.

The image analysis processor 54 calculates a total value or the average value of the brightness of the pixels included in sub-display area SDA1 based on the image data and determines the luminosity of light-emitting diode LD1 based on the total value or the average value. Here, the image analysis processor 54 uses a predetermined operation formula or table and gives a higher value to the luminosity as the total value or the average value of the brightness increases. Similarly, the luminosity of each of light-emitting diodes LD2 to LD6 can be determined based on a total value or the average value of the brightness of pixels PX included in respective sub-display areas SDA2 to SDA6.

In the example of FIG. 10, an image I is displayed in the display area DA. The image I includes a high-brightness part HB emerging over sub-display areas SDA2 and SDA3. The part other than the high-brightness part HB has substantially zero brightness (black). When using image data of the image I, the image analysis processor 54 gives first luminosity which is high to light-emitting diodes LD2 and LD3 corresponding to sub-display areas SDA2 and SDA3 and gives second luminosity which is lower than the first luminosity to light-emitting diodes LD1, and LD4 to LD6 corresponding to sub-display areas SDA1, and SDA4 to SDA6. The second luminosity may be zero and if it is, light-emitting diodes LD1 and LD4 to LD6 are not turned on.

As can be understood from the above, the luminosity of light-emitting diodes LD1 to LD6 is determined based on the brightness of the image displayed in the display area DA, and as a result, high quality image display having a high contrast ratio can be achieved. For example, the image I in FIG. 10 is displayed by light-emitting diodes LD2 and LD3 turned on with the first luminosity and light-emitting diodes LD1 and LD4 to LD6 turned on (or turned off) with the second luminosity which is less than the first luminosity, and therefore, a contrast ratio between the image displayed in sub-display areas SDA2 and SDA3 and the image displayed in sub-display areas SDA1 and SDA4 to SDA6 can be increased.

Furthermore, in a general liquid crystal display device, displaying black by switching liquid crystal molecules of a liquid crystal display panel while turning on a backlight is difficult since light from the backlight cannot be completely shielded by the liquid crystal display panel. Certain amount of light leaks from the display area DA and pure black cannot be displayed. In contrast, with the structure of the present embodiment, when a sub-display area SDA display an image of black entirely or substantially entirely, a light-emitting diode LD corresponding to the sub-display area SDA is turned off or turned on with very low luminosity, and black can be displayed with almost no light leaking.

Furthermore, light-emitting diodes LD which are not necessarily turned on with high luminosity are turned on with lower luminosity or turned off, and thus, the power consumed in the backlight BL can be suppressed.

Furthermore, as in FIGS. 2 and 3, a pixel PX may include a white subpixel SPXW. If the white subpixel SPXW is used appropriately in the color display of the pixel PX, the brightness of the entirety of the display area DA can be increased. Thus, the luminosity of the light-emitting diodes LD can be decreased as a whole and the power consumed in the backlight BL can be suppressed more.

Examples of the display device achieved from the disclosure of the present embodiment are noted below. The reference numerals in brackets may correspond to those applied to structural elements explained in the present embodiment. Examples below do not limit the scope of the invention and various display devices and illumination devices can be achieved from the disclosure of the present embodiment.

(Note 1)

An illumination device comprising:

a light source (LD);

a clad (3) including a first edge (3*a*) at the light source side, a second edge (3*b*) opposite to the first edge, and a plurality of grooves (32) formed by a plurality of partitions (31) extending in parallel to each other from the first edge to the second edge; and a plurality of cores (4) accommodated in the grooves, each core including an incident surface (4*a*) on which light from the light source is incident and an exit surface (4*b*) exposed from the groove to emit the light incident on the incident surface.

(Note 2)

A display device comprising:

a first light source (LD1) and a second light source (LD2) aligned in a first direction (X);

a clad (3) including a first groove (32) and a second groove (32) formed by a plurality of partitions (31) each extending in a second direction (Y) crossing the first direction;

a first core (4) accommodated in the first groove, the first core including a first incident surface (4*a*) on which light from the first light source is incident and a first exit surface (4*b*) exposed from the first groove to emit the light incident from the first incident surface;

a second core (4) accommodated in the second groove, the second core including a second incident surface (4*a*) on which light from the second light source is incident and a second exit surface (4*a*) exposed from the second groove to emit the light incident from the second incident surface;

a display panel (PNL) including a display area (DA) with a first area (SDA1) opposed to the first core and a second area (SDA2) opposed to the second core;

and a controller (50) configured to control luminosity of the first light source and luminosity of the second light source individually.

(Second Embodiment)

Now, the second embodiment will be explained. Unless otherwise specified, the structure, advantage, and the like are the same as those of the first embodiment.

As explained with reference to FIG. 6, if there are groups G (G1 to G6) of a plurality of cores 4 corresponding to a plurality light-emitting diodes LD (LD1 to LD6), boundary stripes may appear at boundaries of groups G with lower luminosity as compared to the other parts. That is, since the light from the light-emitting diodes LD incident on the cores 4 becomes weaker with distance of the cores 4 from the light-emitting diodes LD in the first direction X, the luminosity of the light from the exit surface 4b of the core 4 positioned at the boundary of two adjacent light-emitting diodes LD is lower as compared to that of the other cores 4. Thus, the luminosity possibly becomes uneven along the first direction X when the light-emitting surface LA is viewed as a whole. Such unevenness in luminosity may cause deterioration of the display quality of the liquid crystal display device LCD.

Figure 11:
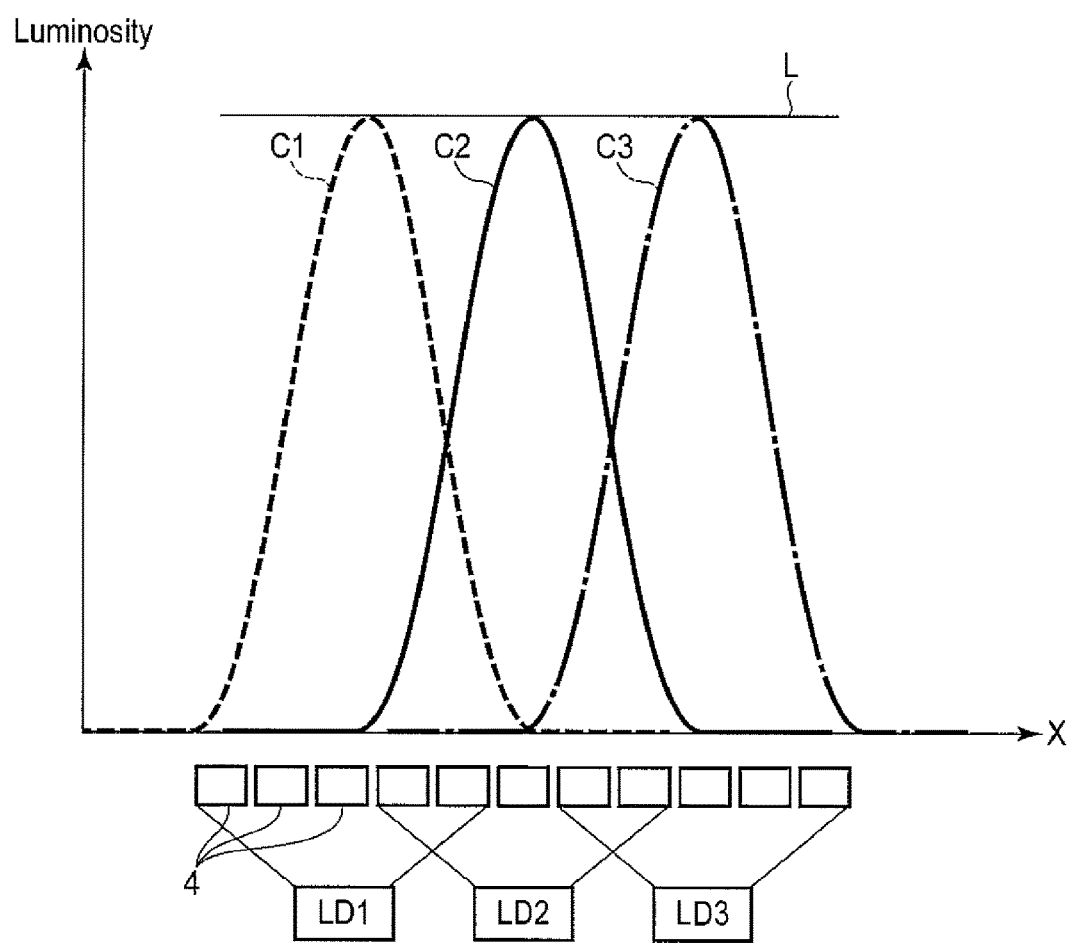
FIG. 11 shows a technical concept of a second embodiment.

FIG. 11 shows an example of a method of preventing boundary stripes. FIG. 11 schematically shows three light-emitting diodes LD1, LD2, and LD3 and eleven cores 4 at its bottom. Light from light-emitting diode LD1 is incident on the first and fifth cores 4 on the left. Light from light-emitting diode LD2 is incident on the fourth to eighth cores 4 from the left. Light from light-emitting diode LD3 is incident on the seventh to eleventh cores 4 from the left.

As above, in the example of FIG. 11, light from adjacent light-emitting diodes LD (LD1 and LD2, LD2 and LD3) is incident on two cores 4 between these adjacent light-emitting diodes LD (LD1 and LD2, LD2 and LD3).

A curve C1 in FIG. 11 shows an example of luminosity distribution of light from light-emitting diode LD1 which is turned on with optional luminosity, and the luminosity distribution is on the light-emitting surface LA along the first direction X at a position distant from light-emitting diode LD1 by an optional distance in the second direction Y. A curve C2 shows an example of luminosity distribution of light from light-emitting diode LD2 which is turned on with the same optional luminosity, and the luminosity distribution is on the light emitting surface LA along the first direction X at a position distant from light-emitting diode LD1 by the same optional distance in the second direction Y. A curve C3 shows an example of luminosity distribution of light from light-emitting diode LD3 which is turned on with the same optional luminosity, and the luminosity distribution is on the light-emitting surface LA along the first direction X at a position distant from light-emitting diode LD1 by the same optional distance in the second direction Y.

The luminosity distribution of each of curves C1 to C3 indicates that the luminosity is high at the direct front of light-emitting diode LD and becomes lower with distance from light-emitting diodes LD in the first direction X. A straight line L on curves C1 to C3 represents the total luminosity which is an addition of the luminosity of curves C1 to C3 in each position in the first direction X. As is evident from the total luminosity represented by the straight line L, unevenness in luminosity in the first direction X does not occur in the example of FIG. 11. Therefore, a boundary stripe as explained above does not occur.

As above, light emitted from adjacent light-emitting diodes LD is incident on the core 4 therebetween to prevent the unevenness in luminosity in the first direction X.

The total luminosity may not necessarily be a straight line. Even if the line is crooked to a certain extent, the display quality of the liquid crystal display device LCD can still be improved.

The number of cores 4 on which light from both adjacent light-emitting diodes LD is incident is not limited to two. It may be one or may be three or more.

To achieve the luminosity distribution without unevenness as represented by the straight line L shown in FIG. 11, the shape of clad 3 and cores 4, the material of clad 3 and cores 4, the distance between light-emitting diodes LD and the clad 3, and the distance between light-emitting diodes LD and cores 4 may be improved suitably in addition to providing cores 4 on which light from adjacent light-emitting diodes LD.

An example of improvement of the shape of clad 3 will be explained with reference to FIG. 12. FIG. 12 schematically shows three light-emitting diodes LD1, LD2, and LD3 and a plurality of cores 4 on which light from light-emitting diodes LD1 to LD3 is incident. Unlike the example of FIG. 11, light from each of light-emitting diodes LD1 to LD3 is incident on seven cores 4. The number of cores 4 on which light from adjacent light-emitting diodes LD (LD1 and LD2, LD2 and LD3) is two.

In the example of FIG. 12, partitions 31 between cores 4 on which light from one light-emitting diode LD is incident are changed in thickness such that the partition becomes thinner with distance from the direct front of the light-emitting diode LD. Considering six partitions 31 between seven cores 4 on which light from light-emitting diode LD2, for example, the width of each of two partitions 31 at their center is W1, the width of each of next two partitions 31 is W2 which is less than W1, and the width of each of next two partitions 31 is W3 which is less than W2 (W1>W2>W3). In the example of FIG. 12, cores 4 have the same width.

In the example of FIG. 12, partitions 31 include first partitions positioned between adjacent light-emitting diodes LD and second partitions positioned in front of light-emitting diodes LD. First partition has a first width which is narrower than a second width of second partition. The first partitions are partitions 31 positioned in a slanting direction of light-emitting diodes LD (positioned in a direction crossing both the first direction X and the second direction Y). Therefore, a first distance between the first partitions and light-emitting diodes LD is longer than a second distance between the second partitions and light-emitting diodes LD. From a different standpoint, the first partitions are interpreted as partitions 31 positioned between the second partitions positioned in front of light-emitting diodes LD.

As above, since a partition 31 becomes narrower as reaching a boundary of adjacent light-emitting diodes LD, an area occupied by partition 31 decreases in the proximity of the boundary. The partition 31 does not emit light or make any contribution to the improvement of the luminosity, and such a reduced area of the partition 31 can increase the luminosity in the proximity of the boundary. That is, unevenness of the luminosity in the first direction X can be suppressed by changing the width of the partition 31.

Note that the width of the partition 31 is changed in the example above; however, cores 4 may be changed in thickness such that the core 4 becomes wider as reaching a boundary of adjacent light-emitting diodes LD to adjust the luminosity of the light-emitting surface LA. Considering, for example, light from one light-emitting diode LD is incident on seven cores 4 and the number of cores 4 on which light from adjacent light-emitting diodes LD is two, the width of each of two cores 4 at their center is W3, the width of each of next two cores 4 is W2, and the width of each of next two cores 4 is W1 (W1>W2>W3).

Furthermore, both the width of partition 31 and the width of cores 4 can be adjusted.

In the second embodiment described above, a core 4 on which light from two adjacent light-emitting diodes LD is used to suppress boundary stripes. However, this is not the only method to suppress boundary stripes. For example, boundary stripes can be suppressed by providing pinholes with the partition 31 to guide light alternately between a core 4 at one side and a core 4 at the other side of the partition 31.

FIG. 13 shows an example of the structure of the above variation, and FIG. 13 schematically shows a cross-section of the clad 3 and the light-emitting diode LD taken along the Y-Z plane. In the example of FIG. 13, the partition 31 of the clad 3 has a plurality of pinholes 33 passing through a groove 32 at the one side to a groove 32 at the other side. Note that the pinhole 33 may not necessarily be a circular hole and may be a notch made on the partition 31 from the top 31a side.

Light which propagates the core 4 at one side of the partition 31 partially leaks from the pinholes 33 and is incident on the core 4 at the other side. That is, each light propagates these cores 4 is mixed with one another through pinholes 33 and the luminosity of the exit surface 4b of these cores 4 becomes uniform. As a result, unevenness of the luminosity of the light-emitting surface LA in the first direction X can be suppressed and generation of the boundary stripes can be prevented.

Pinholes 33 may not necessarily be provided with the entire partitions 31. For example, partitions 111 positioned in front of light-emitting diodes LD may not include pinholes 33 and only one or more partitions 31 positioned between adjacent light-emitting diodes LD may include pinholes 33. Alternately, for example, the number of pinholes 33 may be changed partition by partition such that the number of pinholes 33 in the partitions 31 gradually reduces as becoming close to the front of light-emitting diodes LD.

The light which is incident on the core 4 from the first edge 3a side attenuates as propagating to the second edge 3b side. Considering this point, the density of pinholes 33 may be gradually decreased toward the second edge 3b side from the first edge 3a side in the partition 31 as shown in FIG. 13. Note that, instead of changing the density, the size of pinhole 33 (area of opening, diameter, or the like) may be gradually reduced toward the second edge 3b side from the first edge 3a side.

Furthermore, if pinholes 33 are arranged in pattern such that pinholes 33 are arranged in the same positions in each partition 31 in the second direction Y, light leaking through the pinholes 33 may possibly be recognized as stripes. Considering this point, pinholes 33 in each partition 31 may be arranged randomly.

(Third Embodiment)

The third embodiment will be explained. Unless otherwise specified, the structure, advantage, and the like are the same as those of the first embodiment.

Figure 14:
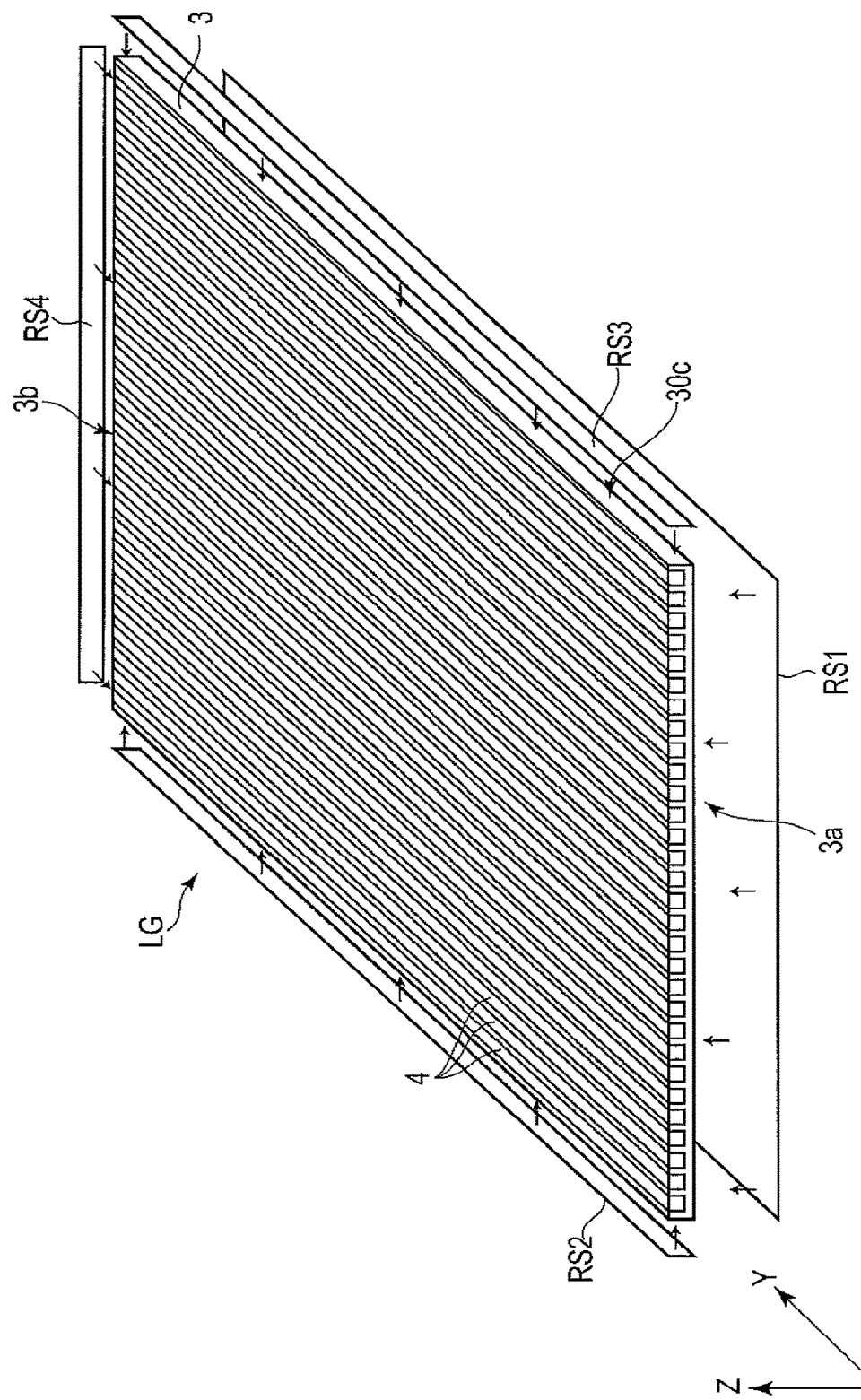
FIG. 14 shows a structural example of a third embodiment.

FIG. 14 shows a structural example of the third embodiment, and FIG. 14 shows the light-guide LG, reflective sheet RS1 of FIG. 1, and other reflective sheets RS2, RS3, and RS4. Reflective sheet RS1 is provided with the rear surface of the light-guide LG (the second surface 30b of the clad 3). Reflective sheets RS2 and RS3 are provided with two side surfaces along the second direction Y of the side surfaces 30c of the clad 3. Reflective sheet RS4 is provided with the side surface at the second edge 3b side of the side surfaces 30c of the clad 3. Reflective sheets RS1 to RS4 are adhered to respective surfaces of the clad 3 via, for example, adhesive layers.

Light from light-emitting diodes LD to be incident on the cores 4 scarcely leaks to the clad 3 from the cores 4 because of a reflective index different between the clad 3 and the cores 4. However, light outgoing from the exit surface 4b of the cores 4 is reflected by the optical sheet OS and the liquid crystal display panel PNL, and returns to the light-guide LG. Such light may possibly pass the clad 3 and the cores 4 and leak from the second surface 30b of the clad 3 (the rear surface of the light-guide LG) and from the side surface 30c (the side surface of the light-guide LG).

With reflective sheets RS1 to RS4, the light leaking from the rear surface of the light-guide LG is reflected to the clad 3 by reflective sheet RS1, and the light leaking from the side surfaces of the light-guide LG is reflected to the clad 3 by reflective sheets RS2 to RS4. The reflected light is used effectively to increase the efficiency of the backlight BL.

Note that reflective sheets RS1 to RS4 may not necessarily be provided with the light-guide LG as a whole, and only one, two, or three of the sheets may be provided. Furthermore, reflective sheet RS1 may partially cover the second surface 30b and reflective sheets RS2 to RS4 may partially cover their corresponding side surfaces 30c.

(Fourth Embodiment)

The fourth embodiment will be explained. Unless otherwise specified, the structure, advantage, and the like are the same as those of the first embodiment.

The present embodiment is related to an example of a method of emitting light incident on cores 4 from an exit surface 4b. FIG. 15 shows a structural example of the fourth embodiment and schematically shows a cross-section of a clad 3, core 4, and light-emitting diode LD taken along the Y-Z plane.

The core 4 in the example of FIG. 15 has a plurality of projections PT on the exit surface 4b. The projections PT are a half-sphere dot pattern formed on the exit surface 4b, for example. As another example, the projections PT may be a prism pattern formed on the exit surface 4b.

Projects PT as a dot pattern or a prism pattern are formed along with or after the formation of the cores 4 on the exit surface 4b by treating the exit surface 4b, or may be formed separately from the cores 4 on the exit surface 4b. The projections PT are provided with the bottom surface of the core 4 contacting the clad 3 (the surface opposite to the exit surface 4b).

The projections PT are effective to improve the efficiency of the light emission by which light propagating inside the core 4 is emitted outside.

If the efficiency of the light emission of the exit surface 4b decreases with distance from the incident surface 4a, the luminosity of the exit surface 4b may be made uniform by gradually increasing the density of the projections PT toward the opposite side to the incident surface 4a as shown in FIG. 15.

Note that the core 4 may have recesses on the exit surface 4b instead of the projections PT. For example, the recess may be formed in a half-spherical shape or a polygonal shape. The recesses may be provided with the bottom surface of the core 4 contacting the clad 3. In a similar manner to the formation of the projections PT, the density of the recesses may be changed.

If a reflective sheet RS4 is provided with the side surface of the clad 3 at the second end 3b side as in the third embodiment, the luminosity of the exit surface 4b may become high at the second end 3b side by the reflected light from the reflective sheet RS4. Considering this point, the density of projections PT or recesses may be increased with distance from the second end 3b. Or, the density of projections PT or recesses may be increased with distance from the incident surface 4a to a certain point and decreased with distance from the point to the second end 3b. For example, the point may be set to be closer to the second end 3b side with reference to the center of the core 4 in the second direction Y.

(Fifth Embodiment)

The fifth embodiment will be explained. Unless otherwise specified, the structure, advantage, and the like are the same as those of the first embodiment.

The present embodiment is related to an example of a method of emitting light incident on cores 4 from the exit surface 4b. FIG. 16 shows a structural example of the fifth embodiment and schematically shows a cross-section of a clad 3 and cores 4 taken along the X-Y plane.

The cores 4 of the example of FIG. 16 include a large number of diffusion structures ST inside thereof. The diffusion structure ST is formed of a material different from the base material of the core 4, for example. As another example, the diffusion structure ST may be a gap (bubble).

The diffusion structures ST are effective to improve the efficiency of the light emission by which light propagating inside the core 4 is emitted outside.

If the efficiency of the light emission of the exit surface 4b decreases with distance from the incident surface 4a, the luminosity of the exit surface 4b may be made uniform by gradually increasing the density of the diffusion structures ST toward the opposite side to the incident surface 4a as shown in FIG. 16.

If a reflective sheet RS4 is provided, the density of the diffusion structures ST may be increased with distance from the second end 3b as in the fourth embodiment. Or, the density of the diffusion structures ST may be increased with distance from the incident surface 4a to a certain point and decreased with distance from the point to the second end 3b.

(Sixth Embodiment)

The sixth embodiment will be explained. Unless otherwise specified, the structure, advantage, and the like are the same as those of the first embodiment.

The present embodiment is related to an example of a method of emitting light incident on cores 4 from an exit surface 4b. FIG. 17 shows a structural example of the fourth embodiment and schematically shows a cross-section of a clad 3, core 4, and light-emitting diode LD taken along the Y-Z plane.

In the example of FIG. 17, the core 4 is formed in a wedge shape. That is, a thickness T1 of the core 4 in the third direction Z (normal to the exit surface 4b) decreases with distance from the incident surface 4a in the second direction Y. In contrast, a thickness T2 of the clad 3 in the third direction Z increases with distance from the first edge 3a in the second direction Y.

With this structure, the light incident on the cores 4 from the light-emitting diodes LD is reflected to the exit surface 4b at the boundary between the rear surface 4c of the cores 4 (the opposite surface to the exit surface 4b) and the clad 3. Thus, the light can suitably be emitted from the exit surface 4b.

Note that FIG. 17 shows a structural example in which both the clad 3 and the cores 4 change their thicknesses with distance from the incident surface 4a in the second direction Y; however, only the thickness of the cores 4 may be changed while the thickness of the clad 3 is kept constant.

If a reflective sheet RS4 is provided, the thickness T1 of the core 4 may be decreased with distance from the second end 3b for facilitated ejection of the reflected light from the exit surface 4a. Or, the thickness T1 of the core 4 may be decreased with distance from the incident surface 4a to a certain point, and increased with distance from the point to the second end 3b.

(Seventh Embodiment)

The seventh embodiment will be explained. Unless otherwise specified, the structure, advantage, and the like are the same as those of the first embodiment.

Light from light-emitting diodes LD and incident on the light-guide LG is mainly emitted from the exit surfaces 4b of core 4. Thus, stripes of low luminosity may possibly be generated at tops 31a of partitions 31 of a clad 3 in the light-emitting surface LA. The present embodiment is related to a method of preventing or lessening such stripes.

FIGS. 18 and 19 show a structural example of the seventh embodiment and schematically show a cross-section of the clad 3 and cores 4 taken along the X-Z plane, respectively. In the examples of these figures, each top 31a of the partition 31 of the clad 3 is narrowed toward its tip and each core 4 is widened in the first direction X to correspond to the shape of the top 31a.

In the example of FIG. 18, the top 31a is rounded in an arc-like shape, and the core 4 is filled to the tip of the top 31a rounded in an arc-like shape. In the example of FIG. 19, the top 31a is tapered toward the tip of the top 31a and the core 4 is filled to the tip of the tapered top 31a.

With these structures, the exit surfaces 4b are spread over the partitions 31. Thus, the stripes caused by the partitions 31 can be prevented or lessened.

Note that, in the examples of FIGS. 18 and 19, adjacent cores 4 are divided by the partitions 31. However, adjacent cores 4 may be connected to each other over the tips of the partitions 31.

(Eighth Embodiment)

The eighth embodiment will be explained. Unless otherwise specified, the structure, advantage, and the like are the same as those of the first embodiment.

The present embodiment is related to a method of efficiently guiding light from light-emitting diodes LD to incident surfaces 4a of cores 4.

FIG. 20 shows a structural example of the eighth embodiment and schematically shows a part of a backlight BL. The backlight BL includes a plurality of lenses 90 arranged between light-emitting diodes LD and a light-guide LG. The lens 90 is a concave lens including an arc-like shape recess 91.

In the example of FIG. 20, the lens 90 faces five incident surfaces 4a of five consecutive cores 4. A light-emitting diode LD is arranged in the recess 91 of the lens 90. The lens 90 radiates the light from the light-emitting diode LD and emits the radiated light from the surface opposite to the recess 91. The light emitted from the lens 90 is incident on the incident surfaces 4a of the cores 4 facing the lens 90. Using the lens 90, the light from the light-emitting diodes LD can effectively be guided to the incident surfaces 4a of the cores 4.

Note that, if the light-emitting diodes LD are arranged to be close to the lenses 90, heat from the light-emitting diodes LD easily reaches the lenses 90. For example, if the lens 90 is formed of a material of excellent heat resistivity and heat insulation, deformation of the lens 90 caused by the heat from the light-emitting diode LD can be suppressed and the heat transmittance from the light-emitting diodes LD to the light-guide LG can be prevented.

FIG. 21 schematically shows another example of the lens 90. In the example depicted, the lens 90 is formed continuously between the light-emitting diodes LD of the light source unit LU and the light-guide LG, and the lens 90 includes a plurality of recesses 91 corresponding to the arrangement positions of the light-emitting diodes LD. The lens 90 with such a structure can guide the light from the light-emitting diodes LD to the incident surfaces 4a of the cores 4.

Here, an interface may be created between every two adjacent lenses 90 in the example of FIG. 20, but an interface is not created in the example of FIG. 21. Therefore, the lens 90 of the example of FIG. 21 can easily be applied to a case where light from adjacent light-emitting diodes LD is guided to the cores 4 therebetween as in the second embodiment.

The structures of the embodiments described above can be combined arbitrarily or modified in various ways. For example, in each of the embodiments described above, a backlight equipped in a liquid crystal display device is exemplified as an illumination device. However, the structure of the backlight disclosed in each of the embodiment described above can be applied to a front light used in a reflective type display device.

Furthermore, additional advantages obtained from the first to eighth embodiments are, as long as they are obvious from the disclosure of the present application or easily conceivable from a person having ordinary skill in the art, naturally encompassed by the scope of the present application.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a plurality of light sources;
a first member including a first edge, a second edge opposite to the first edge, and a plurality of partitions, wherein the partitions extend in parallel to each other from the first edge to the second edge; and
a plurality of second members, wherein each of the second members is arranged between adjacent two partitions of the plurality of partitions, and each of the second members includes an incident surface on which light from the light source is incident and an exit surface which is surrounded by the first edge, the second edge and the adjacent two partitions to emit the light incident on the incident surface,
wherein the light sources are arranged along the first edge,
wherein the partitions include a first partition positioned between the light sources and a second partition positioned in front of one of the light sources, and
wherein a first width of the first partition is less than a second width of the second partition.

2. The display device of claim 1, wherein
the first member is formed of a first material having a first refractive index, and
each of the second members is formed of a second material having a second refractive index which is greater than the first refractive index.

3. The display device of claim 1, further comprising:
a controller configured to control luminosity of a first light source and a second light source which are included in the light sources individually.

4. A display device comprising:
a light source;
a first member including a first edge at a light source side, a second edge opposite to the first edge, and a plurality of partitions, wherein the partitions extend in parallel to each other from the first edge to the second edge; and
a plurality of second members, wherein each of the second members is arranged between adjacent two partitions of the plurality of partitions, and each of the second members includes an incident surface on which light from the light source is incident and an exit surface which is surrounded by the first edge, the second edge and the adjacent two partitions to emit the light incident on the incident surface, wherein
the first member is formed of a first material having a first refractive index,
each of the second members is formed of a second material having a second refractive index which is greater than the first refractive index, and
a top of at least one of the partitions is shaped to be narrower toward a tip thereof.

5. The display device of claim 4, wherein
the top is formed in an arc-shape or in a tapered-shape narrowed toward the tip.

6. The display device of claim 4, wherein
each of the second members includes a plurality of projections or recesses formed on the exit surface, the projections or the recesses configured to emit light propagating in each of the second members.

7. The display device of claim 6, wherein
density of the projections or the recesses increases with distance from the incident surface.

8. The display device of claim 4, wherein
each of the second members includes a plurality of diffusion structures inside thereof, the diffusion structures configured to diffuse light propagating in each of the second members.

9. The display device of claim 8, wherein
density of the diffusion structures increases with distance from the incident surface.

10. The display device of claim 4, wherein
a thickness of each of the second members normal to the exit surface decreases with distance from the incident surface.

11. The display device of claim 4, wherein
each of the second members is widened in the proximity of the top of at least one of the adjacent two partitions toward a tip thereof.

12. The display device of claim 4, further comprising:
a lens disposed between the light source and the incident surface, the lens configured to radiate light from the light source to be incident on the incident surface,
wherein the light from the lens is incident on the plurality of second members.

13. The display device of claim 4, further comprising:
a lens includes a first lens and a second lens which are arranged in a first direction,
wherein the light source includes a first light source opposed to the first lens and a second light source opposed to the second lens, and
one of the partitions and a border line between the first lens and the second lens have a same coordinate in the first direction.

14. The display device of claim 4, wherein
the first member includes a first surface on which the partitions are formed, a second surface opposite to the first surface, and side surfaces between the first and second surfaces, and
the display device further comprises a reflective sheet provided on at least a part of the second surface and the side surfaces.

15. The display device of claim 4, further comprising:

a controller configured to control luminosity of a first light source and a second light source which are included in the light source individually.

16. The display device of claim 15, wherein the controller is configured to control the luminosity of the first light source according to brightness of a first image displayed in a first area of a display panel opposed to a first one of the second members on which light from the first light source is incident and the luminosity of the second light source according to brightness of a second image displayed in a second area of display panel opposed to a second one of the second members on which light from the second light source is incident.

17. A display device comprising:

a light source;

a first member including a first edge at a light source side, a second edge opposite to the first edge, and a plurality of partitions, wherein the partitions extend in parallel to each other from the first edge to the second edge; and a plurality of second members, wherein each of the second members is arranged between adjacent two partitions of the plurality of partitions, and each of the second members includes an incident surface on which light from the light source is incident and an exit surface which is surrounded by the first edge, the second edge and the adjacent two partitions to emit the light incident on the incident surface, wherein at least one of the partitions includes a plurality of holes.

18. The display device of claim 17, wherein the first member is formed of a first material having a first refractive index, and each of the second members is formed of a second material having a second refractive index which is greater than the first refractive index.

19. The display device of claim 17, further comprising:

a controller configured to control luminosity of a first light source and a second light source which are included in the light source individually.

* * * * *